US012749818B2

(12) United States Patent
Chahat et al.

(10) Patent No.: US 12,749,818 B2
(45) Date of Patent: Sep. 29, 2026

(54) METAL-ONLY FLAT METASURFACE ANTENNA

(71) Applicant: CALIFORNIA INSTITUTE OF TECHNOLOGY, Pasadena, CA (US)

(72) Inventors: Nacer E. Chahat, Altadena, CA (US); Gaurangi Gupta, Pasadena, CA (US); John L. Wolff, Pasadena, CA (US); Adrian J. Tang, Pasadena, CA (US); Goutam Chattopadhyay, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 236 days.

(21) Appl. No.: 18/348,300

(22) Filed: Jul. 6, 2023

(65) Prior Publication Data

US 2024/0014568 A1 Jan. 11, 2024

Related U.S. Application Data

(60) Provisional application No. 63/359,112, filed on Jul. 7, 2022.

(51) Int. Cl.

*H01Q 15/00* (2006.01)
*H01Q 19/13* (2006.01)

(52) U.S. Cl.

CPC ....... *H01Q 15/0086* (2013.01); *H01Q 19/132* (2013.01); *H01Q 19/138* (2013.01)

(58) Field of Classification Search

CPC ............. H01Q 15/0086; H01Q 19/132; H01Q 19/138; H01Q 21/0031; H01Q 21/005; H01Q 21/064

See application file for complete search history.

(56) References Cited

U.S. PATENT DOCUMENTS 3,212,095 A * 10/1965 Ajioka ................. H01Q 19/138 343/785
3,235,869 A * 2/1966 Van Atta ................ H01Q 13/28 343/785

(Continued)

FOREIGN PATENT DOCUMENTS

JP 5913092 B2 4/2016
WO WO-2019238643 A1 * 12/2019 ............. H01Q 13/22

OTHER PUBLICATIONS

Gomez-Torrent et al., "A Low-Profile and High-Gain Frequency Beam Steering Subterahertz Antenna Enabled by Silicon Micromachining," in IEEE Transactions on Antennas and Propagation, vol. 68, No. 2, pp. 672-682, Feb. 2020, doi: 10.1109/TAP.2019.2943328. (Year: 2020).*

(Continued)

*Primary Examiner* — Dimary S Lopez Cruz
*Assistant Examiner* — Brandon Sean Woods
(74) *Attorney, Agent, or Firm* — Steinfl + Bruno LLP

(57) ABSTRACT

A metal-only flat metasurface antenna is described. The antenna includes a pillbox beamformer combined with a metasurface structure provided by an array of non-resonant subwavelength unit elements having opening sizes that are strictly smaller than half of the guided-mode wavelength. The pillbox beamformer includes bottom and top parallel plate waveguides (PWPs) forming respective bottom and top cavities for propagation of the guided-mode. Bottom, middle and top metal plates form the two PWPs. Arranged at one end of the bottom and top PWPs is a respective parabolic structure. An all-metal horn structure is centrally arranged at a second end of the bottom PWP opposite the parabolic structure. According to one aspect, the horn structure includes a single feed port arranged at a focal point of the parabolic structure. According to another aspect, the horn (Continued)

structure includes two feed ports arranged at an offset of the focal point.

24 Claims, 17 Drawing Sheets

(56) References Cited

U.S. PATENT DOCUMENTS

| | | | | |
|---|---|---|---|---|
| 9,246,232 | B2 * | 1/2016 | Sauleau | H01Q 13/22 |
| 2012/0092224 | A1 | 4/2012 | Sauleau et al. | |
| 2018/0005407 | A1 * | 1/2018 | Browning | G05D 1/024 |
| 2020/0028261 | A1 * | 1/2020 | Foo | H01Q 3/36 |

OTHER PUBLICATIONS

Basavarajappa, V. et al., "Millimeter Wave Dual-Band Multi-Beam Waveguide Lens-Based Antenna" arXiv:1804.02364, 22nd International ITG Workshop on Smart Antennas, WSA 2018. 6 pages.
Gomez-Torrenta, A. et al., "Low-Profile and High-Gain Frequency Beam Steering Subterahertz Antenna Enabled by Silicon Micromachining" IEEE Transactions on Antennas and Propagation, vol. 68, No. 2, Feb. 2020. pp. 672-682. 11 pages.
Pandey, A., "Pillbox Antenna Design and Simulation" https://anilkrpandey.wordpress.com/2017/05/13/pillbox-antenna-design-and-simulation. May 13, 2017. 2 pages.
Ruiz-Garcia, J. et al. "Multi-beam Modulated Metasurface Antenna for BackhaulApplications at K-band" URSI-France 2020 Workshop / Journées URSI-France (2020). 2 pages.
Tekkouk, K. et al., "Recent and Future Research Trends in PlanarMulti-beam Antennas in the Millimeter WaveRange at IETR-France" Proceedings of ISAP2016, Okinawa, Japan, 2016 (IEICE), pp. 124-125. 2 pages.
K. Tekkouk, M. Ettorre and R. Sauleau, "Multi-beam slotted Waveguide pillbox antenna with reduced side lobe level and high beam crossover," 2016 10th European Conference on Antennas and Propagation (EuCAP), Davos, Switzerland, 2016, pp. 1-4, doi: 10.1109/EuCAP.2016.7481723.
M. Ettorre, R. Sauleau, L. Le Coq and F. Bodereau, "Single-Folded Leaky-Wave Antennas for Automotive Radars at 77 GHZ," in IEEE Antennas and Wireless Propagation Letters, vol. 9, pp. 859-862, 2010, doi: 10.1109/LAWP.2010.2071850.
O. Yurduseven et al., "Multibeam Si/GaAs Holographic Metasurface Antenna at W-Band," in IEEE Transactions on Antennas and Propagation, vol. 69, No. 6, pp. 3523-3528, Jun. 2021, doi: 10.1109/TAP.2020.3030898.

* cited by examiner

100

200

METAL-ONLY FLAT METASURFACE ANTENNA

CROSS REFERENCE TO RELATED APPLICATIONS

The present application claims priority to and the benefit of U.S. provisional patent application Ser. No. 63/359,112 entitled "Metal-Only Flat Metasurface Antenna for Single or Multiple Beams", filed on Jul. 7, 2022, the disclosure of which is incorporated herein by reference in its entirety.

STATEMENT OF GOVERNMENT GRANT

This invention was made with government support under Grant No. 80NM00018D0004 awarded by NASA (JPL). The government has certain rights in the invention.

TECHNICAL FIELD

The present disclosure relates to antennas. More particularly, it relates to a metal-only flat metasurface antenna that may be used in airborne radar systems capable of operating in harsh environments while maintaining an overall light weight and low profile of the systems.

BACKGROUND

Antennas may be considered as an essential part of radar and/or communication systems that operate based transmission and/or reception of electromagnetic waves. A prior art example of an antenna system (100), commonly known as a reflector antenna system, that is capable of simultaneous transmission (TB) and reception (RB) is shown in FIG. 1. The prior art antenna system (100) includes a transmission antenna, 100T, and a reception antenna, 100R, that may be considered as substantially co-located. As shown in FIG. 1, each of the two co-located antennas (100T, 100R) includes a parabolic reflector (110T or 110R) that either directs a radiating signal from a feed horn (e.g., 150T) into a transmit beam, TB, or focuses a receive beam, RB, into a feed horn (e.g., 150R). Other commonly used types of prior art reflector antennas include, for example, Cassegrain reflector antenna systems that although providing some advantages with respect to the prior art reflector antenna system (100), use similarly shaped parabolic reflectors (e.g., 110T, 100R).

These parabolic reflectors are typically shaped like portions of a sphere and therefore include substantial dimensions (e.g., bulkiness, volume) in a three-dimensional coordinate system, rendering them bulky, heavy and requiring large volumes. In turn, such unfavorable characteristics may render integration of the prior art antenna systems based on parabolic reflectors in applications that require compact and low-profile platforms challenging. Such applications may include small platform airborne radar systems, including for example CMOS radar systems, that may be integrated with UAVs, Cubesats or Smallsats. Although some recent technological advancements have resulted in design and realization of flat and low-profile antennas that may be used in such compact and low-profile platforms, their complicated fabrication and assembly/alignment of corresponding multi-material structures/layers (e.g., dielectrics and metals) may render their use in low-cost applications prohibitive, and their use in harsh environments challenging.

It follows that teachings according to the present disclosure describe a metal-only (i.e., all-metal) flat metasurface antenna that is simple to fabricate and assemble/align, and includes a gain that is sufficiently high for use in airborne radar systems capable of operating in harsh environments while maintaining an overall light weight and low profile of the systems.

SUMMARY

According to one embodiment the present disclosure, a metal-only flat metasurface antenna is presented, comprising: a pillbox beamformer comprising a top parallel plate waveguide stacked on a bottom parallel plate waveguide; and a metasurface structure provided by an array of non-resonant subwavelength unit elements formed in the top parallel plate waveguide, wherein the pillbox beamformer and the metasurface structure are made exclusively from a metal material.

According to a second embodiment of the present disclosure, a shared-aperture metal-only flat metasurface antenna is presented, comprising: a pillbox beamformer comprising stacked top and bottom parallel plate waveguides with embedded parabolic structures, said parallel plate waveguides electromagnetically coupled to one another via a coupling slot formed in the pillbox beamformer; and a holographic metasurface structure provided by an array of non-resonant subwavelength unit elements formed in the top parallel plate waveguide, said metasurface structure configured to provide an aperture for simultaneous transmission of a transmit beam and reception of a receive beam, wherein each unit element comprises a rectangular slot having length and width that is smaller than, or equal to, 0.4 times a wavelength of the transmit or receive beam; wherein the pillbox beamformer further comprises a horn structure in the bottom parallel waveguide, the horn structure comprising a transmit port for sourcing the transmit beam and a receive port receiving the receive beam, and the pillbox beamformer and the holographic metasurface structure are made exclusively from a metal material.

Further aspects of the disclosure are shown in the specification, drawings and claims of the present application.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

DETAILED DESCRIPTION

Figure 1:
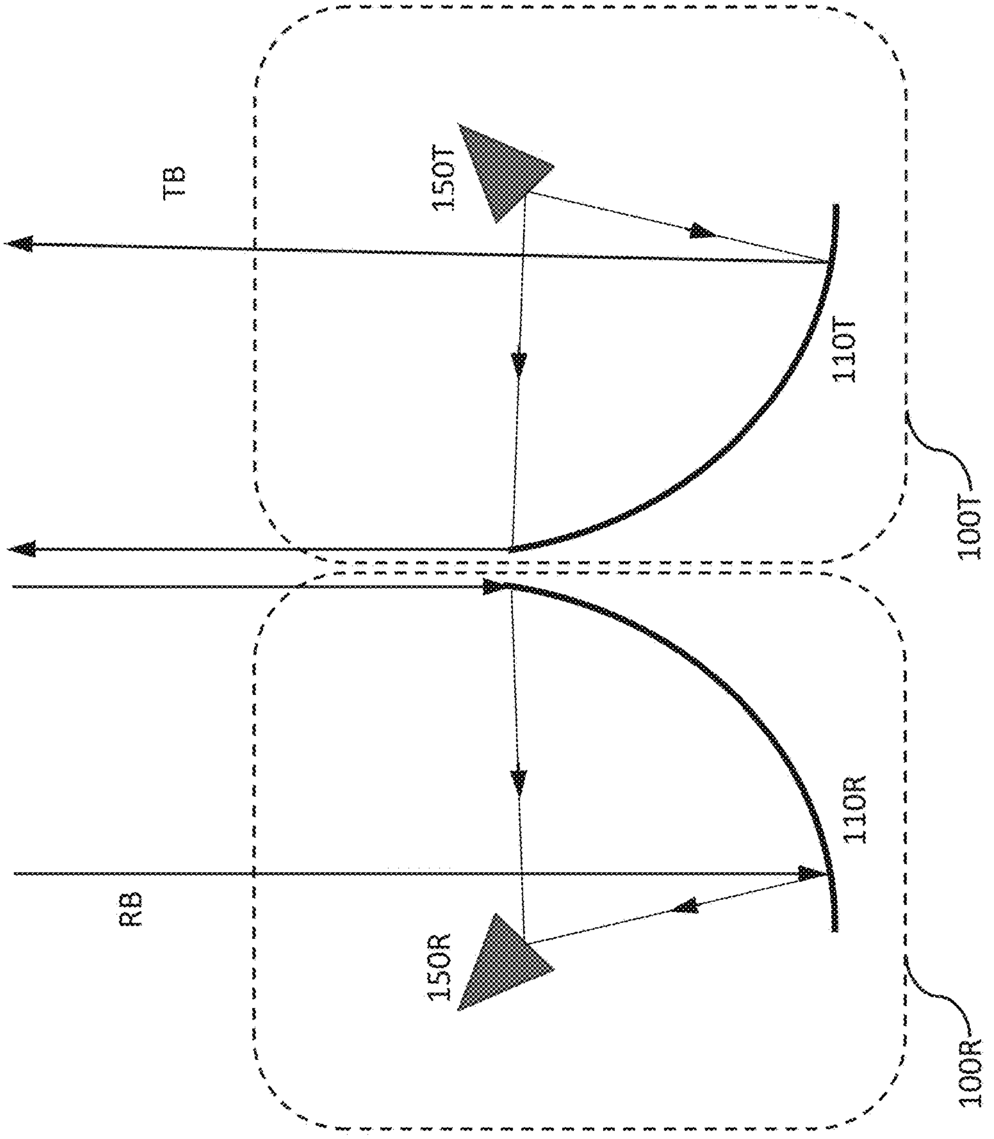
Prior Art FIG. 1
FIG. 1 shows a simplified schematic of a prior art antenna system based on parabolic reflectors.
Figure 2A:
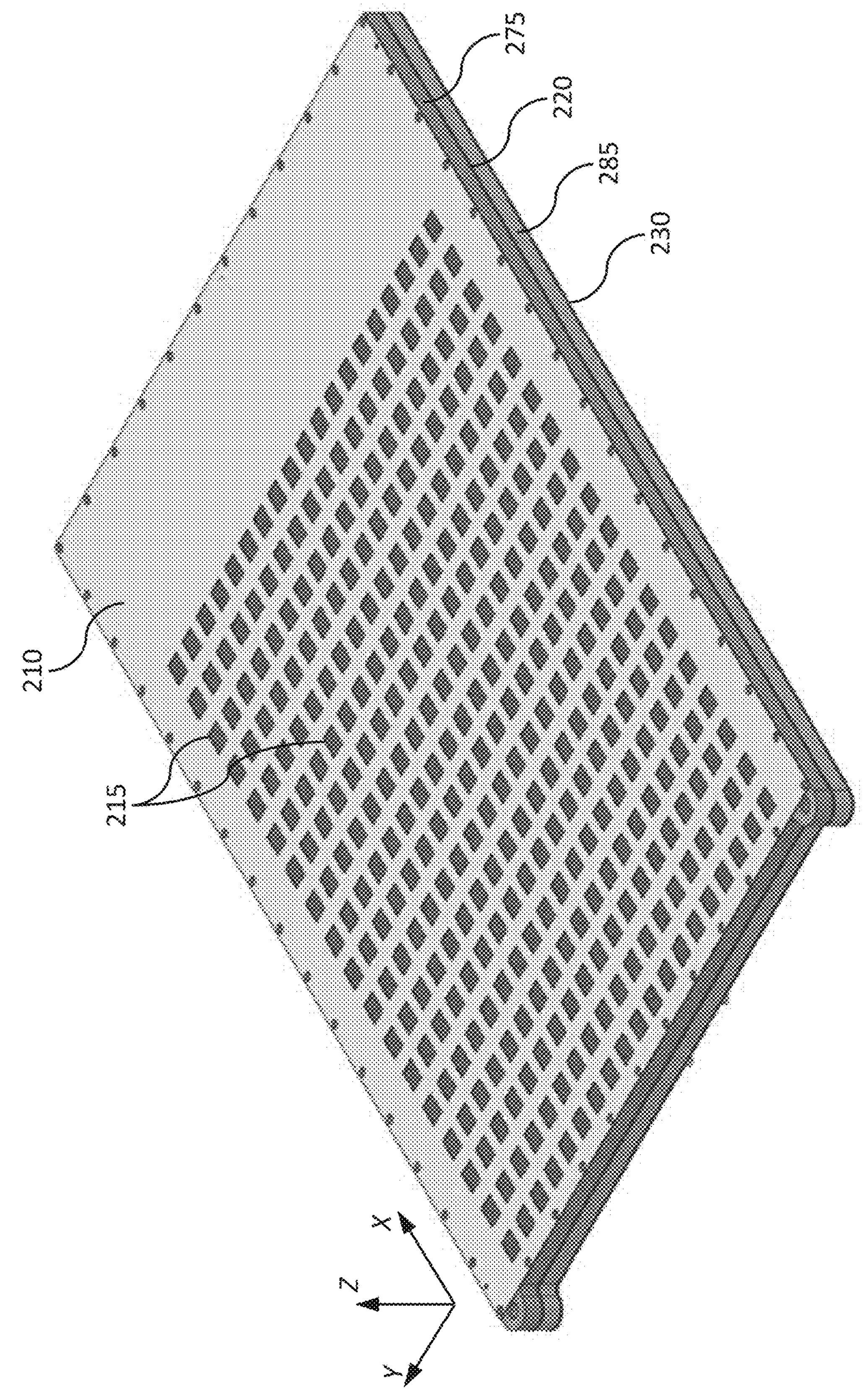
FIG. 2A shows a top side perspective view of a metal-only flat metasurface antenna according to an embodiment of the present disclosure.

FIG. 2A shows a top side perspective view of a metal-only flat metasurface antenna (200) according to an embodiment of the present disclosure. As shown in FIG. 2A, the metal-only flat metasurface antenna (200) includes a planar profile in a (x,y) plane that is orthogonal to a z-axis. The metal-only flat metasurface antenna (200) according to the present teachings may include a stacked arrangement of metal-only plates (e.g., panels), including a bottom (metal) plate (230), a middle (metal) plate (220) and top (metal) plate (210), separated and supported through a metal framing structure (275, 285, later described) to form a bottom waveguide and a top waveguide for propagation of electromagnetic waves through the metal-only flat metasurface antenna.

The top plate (210) includes a metasurface structure provided by an array of unit elements (215, unit cells) that in the exemplary case shown in FIG. 2A are arranged according to a plurality of rows (e.g., y-axis) and columns (e.g., x-axis), each unit element (215) comprising an opening that penetrates through an entirety of a thickness of the top plate (210). Although the present figures show unit elements with openings having a rectangular/square (planar) shape, other opening shapes may be envisioned, including for example, openings having the shape of a triangle, circle, pentagon, octogen, hexagon, cross, etc. . . .

As known in the art, a metasurface structure is a two-dimensional arrangement of specially engineered subwavelength structures (e.g., unit elements 215) that manipulate the electromagnetic waves in desired ways. These structures are typically patterned on a planar surface/layer (e.g., top plate 215) and can include conductive and/or dielectric materials. Metasurface antennas, such as the metal-only flat metasurface antenna (200) of FIG. 2A, offer several advantages over traditional antennas, including their compact size, lightweight design, and ability to control and shape the radiation pattern with high precision. They are capable of manipulating the phase, amplitude, and polarization of electromagnetic waves, enabling advanced beamforming and focusing capabilities.

The metasurface unit elements (e.g., 215 of FIG. 2A) of a metasurface antenna (e.g., 200 of FIG. 2A) are designed to exhibit specific electromagnetic properties, such as phase shifting, polarization conversion, or impedance matching. By controlling the geometrical arrangement/shape and properties of these unit elements, the metasurface antenna can achieve desired functionality and performance. In particular, such advantages and functionalities may be attributed to the subwavelength dimensions of the unit elements, or in other words, to dimensions of the unit elements that are smaller than a wavelength propagated/guided through the (waveguides of the) metasurface antenna (e.g., guided-mode).

The unit elements (215) of the metal-only flat metasurface antenna (200) of FIG. 2A include dimensions that are smaller than a guided-mode wavelength, $\lambda_g$, of the (top/bottom waveguides). In particular, such dimensions may be (strictly) smaller than the half-wavelength (i.e., $<0.5\times\lambda_g$) of the guided-mode wavelength, $\lambda_g$. As a consequence of such dimensions, the unit elements (215) may be characterized as non-resonant. The dimensions of each of the unit elements (215), or in other words the size (i.e., $<0.5\times\lambda_g$) of a corresponding opening in any direction in the (x,y) plane, is selected to ensure the unit element (215) weakly couples to the guided-mode. Accordingly, the phase profile of the guided-mode reference does not exhibit a strong perturbation due to the presence of the unit elements (215). In a preferred embodiment according to the present disclosure, such size is selected to be smaller than $0.4\times\lambda_g$. In stark contrast, a resonant unit element that may include dimensions that are equal to, or larger than, the half-wavelength (i.e., $\geq 0.5\times\lambda_g$) may strongly perturb (e.g., excite) the guided-mode. It should be noted that although the unit elements (215) of FIG. 2A are shown as including uniform (same) dimensions across the rows and columns, in some cases it may be advantageous to include non-uniform dimensions as later described with reference to FIG. 7A.

Figure 2B:
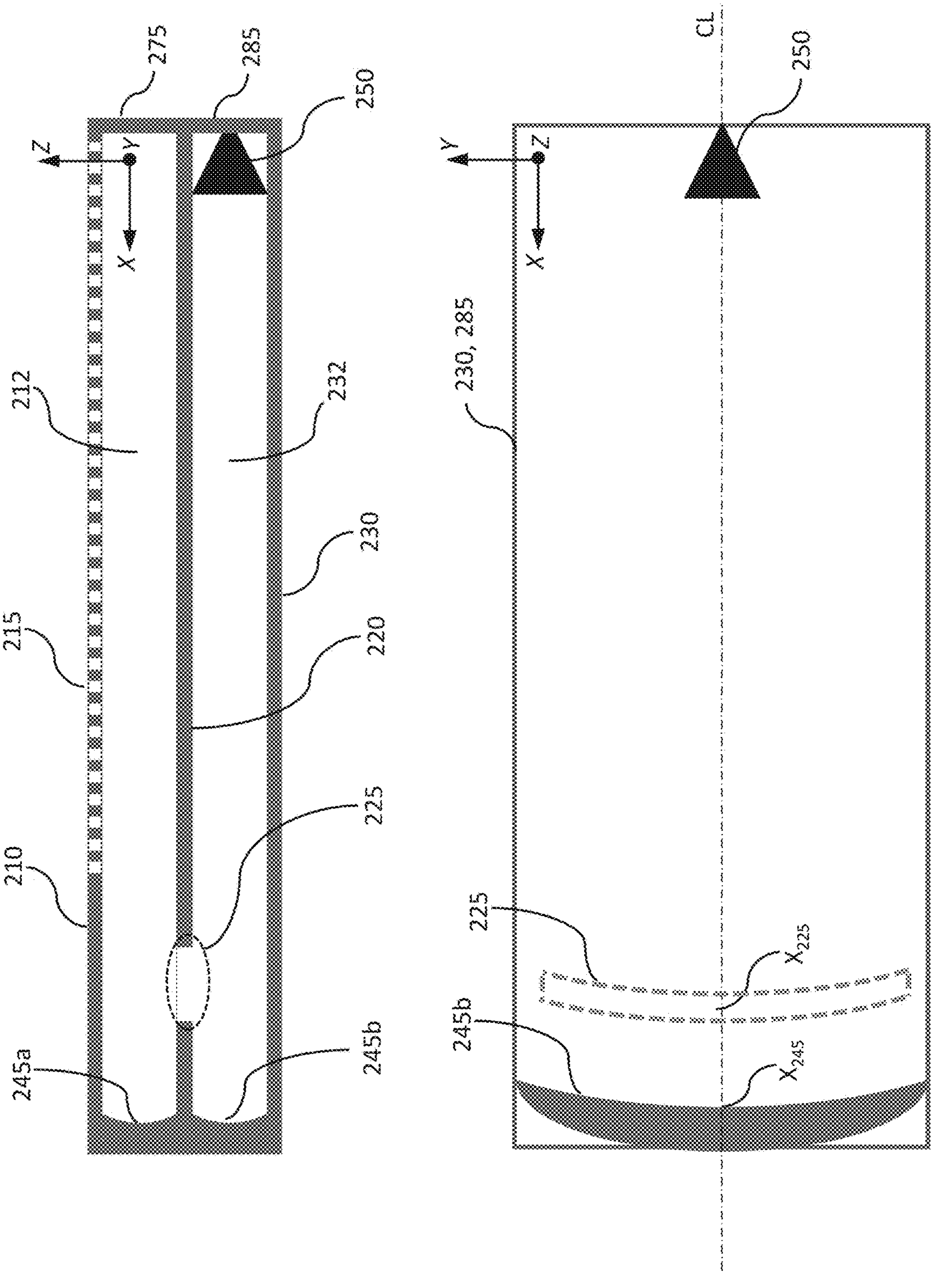
FIG. 2B shows simplified cross-sectional views of the metal-only flat metasurface antenna of FIG. 2A, including a simplified cross-sectional view of a bottom parallel plate waveguide.

FIG. 2B shows simplified cross-sectional side and top views of the metal-only flat metasurface antenna (200) of FIG. 2A. In particular, shown in the top region of FIG. 2B, is a cross-sectional side view of the metal-only flat metasurface antenna (200) including a cavity (212) of the top waveguide and a cavity (232) of the bottom waveguide. The top waveguide, also known as a parallel plate waveguide (PPW), is formed between the top plate (210) and the middle plate (220), and bounded in the (y,z) plane by (walls of) the metal framing structure (275). Furthermore, a (metal) parabolic structure (245*a*, symbolically shown in FIG. 2A as a curvature) that is configured as a reflector (e.g., cylindrical reflector), is arranged at one end of the cavity (212). Likewise, the bottom waveguide, also known as a parallel plate waveguide (PPW), is formed between the bottom plate (230) and the middle plate (220), and bounded in the (y,z) plane by (walls of) the metal framing structure (285). A (metal) parabolic structure (245*b*, symbolically shown in FIG. 2A as a curvature, with characteristics similar to the parabolic structure 245*a*) that is configured as a reflector (e.g., cylindrical reflector), is arranged at one end of the cavity (232) in a same region (e.g., position along the x-axis) of the parabolic structure (245*a*). Furthermore, a (feed) horn structure (250) is arranged at an end of the cavity (232) opposite the parabolic structure (245*b*), for example, at a focal point of the parabolic structure (245*b*). It should be noted that while the two cavities (e.g., 212, 232) may include a same planar profile (e.g., in the x, y plane), their height (e.g., vertical extension along the z-axis) may be equal or different, as the height of the cavities may, in some cases, be used to optimize performance of the pillbox beamformer. Furthermore, it should be noted that the permittivity inside the cavities is essentially equal to 1 (i.e., permittivity of air).

Electromagnetic coupling between the two cavities (212, 232) may be provided by a coupling slot (225, opening) formed in the middle plate (220) proximate (near) the parabolic structures (245*a*, 245*b*). The stacked configuration of the top and bottom waveguides with embedded coupling slot (225) and parabolic structures (245*a*, 245*b*) may be referred to as a pillbox beamformer (or coupler). Accordingly, the metal-only flat metasurface antenna (200) according to the present teachings may be referred to as a pillbox beamformer combined with a metasurface structure provided by the unit elements (215). As shown in FIG. 2B, an extension of the unit elements along a direction of the x-axis may be limited so to not overlap the coupling slot (225).

Shown in the bottom region of FIG. 2B, is a simplified cross-sectional top view of the bottom waveguide of the metal-only flat metasurface antenna (200) showing arrangement of the horn structure (250) and the parabolic structure (245*b*) in the bottom plate (230). Furthermore, a projection (shown in dotted lines) of the coupling slot (225) onto the (x,y) plane of the bottom plate (230) is shown. According to an embodiment of the present disclosure, the horn structure (250) may be centrally arranged along a centerline (CL, along the x-axis) of the bottom plate (230), the centerline CL also being a centerline of the metal-only flat metasurface antenna (200). Furthermore, the parabolic structure (245*b*) may be arranged opposite the horn structure (250), the parabolic structure (245*b*) having a parabolic curvature (surface) that is facing the horn structure (250). It should be noted that the parabolic curvature may be in the (x,y) plane, in other words, the parabolic structure (245*b*) may be considered flat along the z-axis (vertical axis). According to an embodiment of the present disclosure, an axis of symmetry (e.g., that coincides with the vertex) of the parabolic curvature may be provided by the centerline, CL. According to an embodiment of the present disclosure, a plane (x,z) that contains the centerline, CL, may be a plane of symmetry of the parabolic curvature. It should be noted that derivation of the parabolic curvature (e.g., surface of the structure 245*b* facing the horn 250) may be performed according to methods and techniques known in the art, including based on a desired ratio of a focal length, F, to an aperture size, D, of a parabolic structure (e.g., 245*b*) operating as a reflector (with the horn structure 250 at the focal point).

According to an exemplary nonlimiting embodiment of the present disclosure, and as shown in the bottom region of FIG. 2B, the coupling slot (225) may include a profile/outline in the (x,y) plane that follows (mimics) a shape of the parabolic curvature of the parabolic structure (245*b*). In other words, the coupling slot (225) may include an opening along the x-axis provided by two opposite sides (shown as dotted lines), each side having a shape in the (x,y) plane that substantially follows the parabolic curvature at the surface of the parabolic structure (245*b*). It should be noted that other configurations of the coupling slot (225) may be possible, including a configuration that includes a plurality of smaller size slots (smaller openings) in lieu of a single slot, arranged/grouped so to cover an area/region/outline of the coupling slot (225) shown in FIG. 2B.

According to an embodiment of the present disclosure, a distance along the x-axis between the coupling slot (225) and the parabolic structure (245*b*) as well as an opening along the x-axis (e.g., width) provided by the coupling slot (225) may be optimized for increased coupling between the bottom and top waveguides (e.g., cavities 232, 212), and therefore for increased efficiency of the metal-only flat metasurface antenna (200). According to an embodiment of the present disclosure, the distance along the x-axis between the coupling slot (225, e.g., surface at a position $X_{225}$) and the parabolic structure (245*b*, e.g., center at a position $X_{245}$) may be in a range from about $0.3\times\lambda_g$ to about $0.5\times\lambda_g$, where $\lambda_g$ represents the guided mode wavelength (at the frequency of operation of the antenna). According to a further embodiment of the present disclosure, a width provided by the coupling slot (225, e.g., width along the x-axis about the center position $X_{225}$) may be equal to about the guided mode wavelength, $\lambda_g$.

Figure 2C:
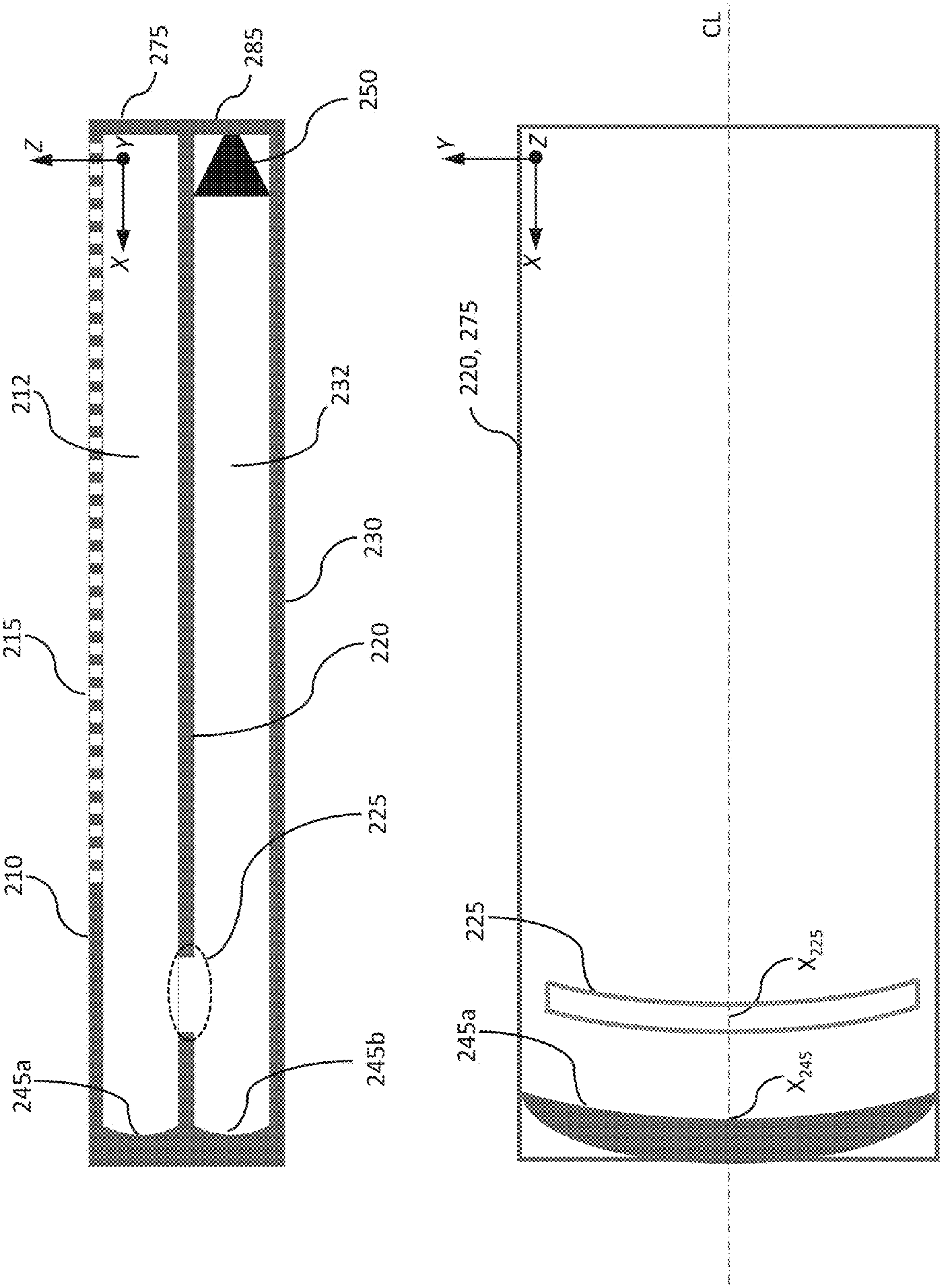
FIG. 2C shows simplified cross-sectional views of the metal-only flat metasurface antenna of FIG. 2A, including a simplified cross-sectional view of a top parallel plate waveguide.

FIG. 2C shows simplified cross-sectional side and top views of the metal-only flat metasurface antenna (200) of FIG. 2A. In particular, shown in the top region of FIG. 2C, is the same cross-sectional side view of the metal-only flat metasurface antenna (200) described above with reference to FIG. 2B. Shown in the bottom region of FIG. 2C, is a simplified cross-sectional top view of the top waveguide of the metal-only flat metasurface antenna (200) showing arrangement of the coupling slot (225) and parabolic structure (245*a*) in the middle plate (220). Characteristics, including position along the x-axis and parabolic curvature, of the parabolic structure (245*a*) can be taken from the above description of the parabolic structure (245*b*) provided with reference to FIG. 2B. Characteristics, including position along the x-axis and profile/outline, of the coupling slot (225) that is formed in the middle plate (220) can be taken from the above related description with reference to FIG. 2B.

Figure 2D:
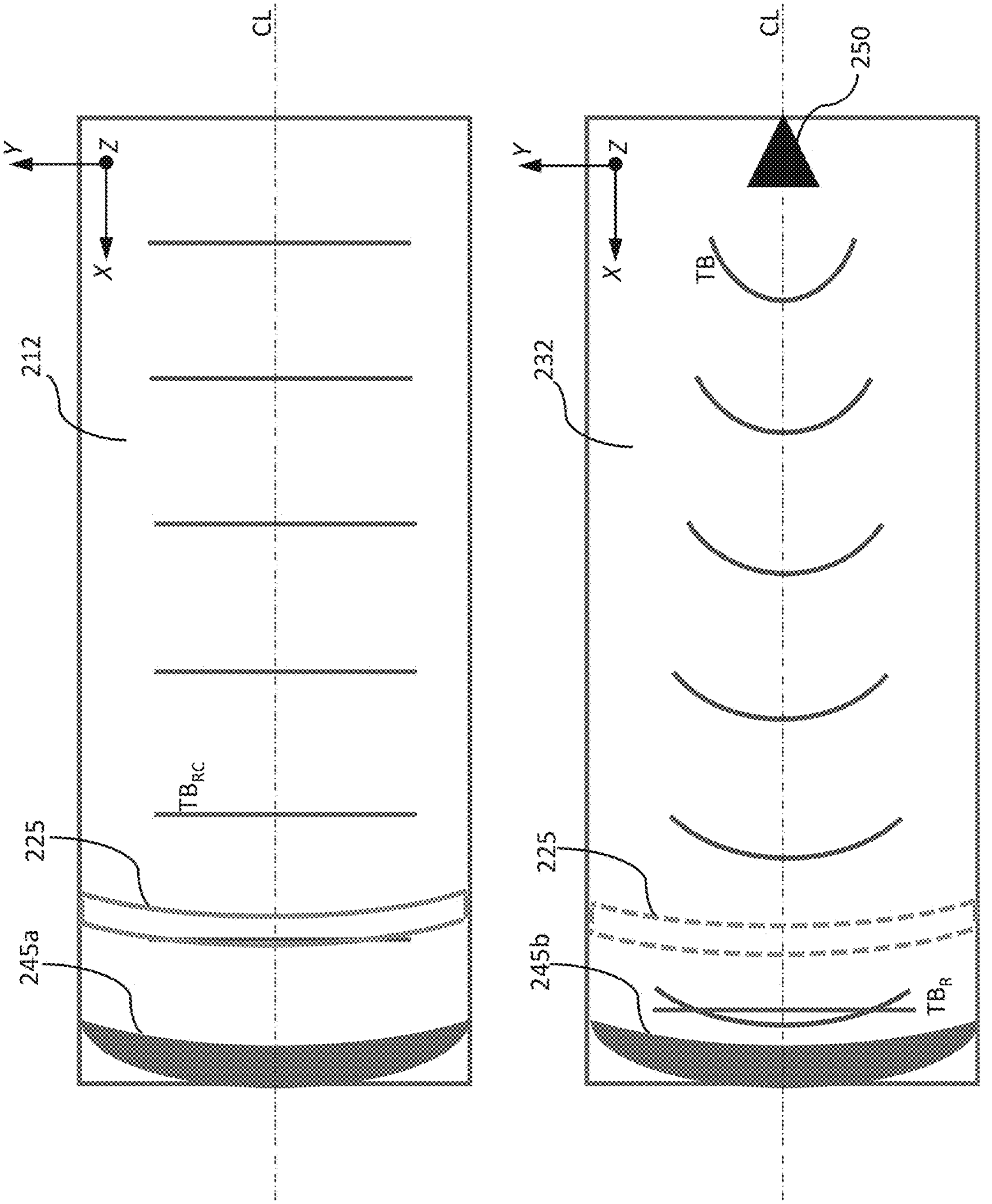
FIG. 2D shows a simplified representation of wave fronts propagating through the bottom and top parallel plate waveguides.

FIG. 2D shows a simplified representation of wavefronts propagating through the bottom and top parallel plate waveguides (PWPs), respectively represented by the cavities (232) and (212). For example, a spherical (e.g., cylindrical) wavefront, TB, emitted by the horn structure (250) may propagate within the bottom PWP (e.g., 232) according to a direction provided by the x-axis towards the parabolic structure (245*b*). Upon reflection from the parabolic structure (245*b*), the spherical wavefront, TB, transitions (transforms) to a planar wavefront, $TB_R$, a portion, $TB_{RC}$, of which couples into the top PWP (e.g., 212) through the coupling slot (225), where it radiates outwards (e.g., transmission) the top PWP through the metasurface provided by the unit elements (e.g., 215 of FIG. 2A) formed in the top plate (e.g., 210 of FIG. 2A). A principle of reciprocity for propagation of an electromagnetic wave may be applied to describe inwards radiation (e.g., reception) of a planar wavefront through the metasurface at the top PWP (e.g., 212), reflection from the parabolic structure (245*a*) with subsequent transition to a spherical wavefront, coupling to the bottom PWP (e.g., 232) and reception through the horn structure (250).

Figure 2E:
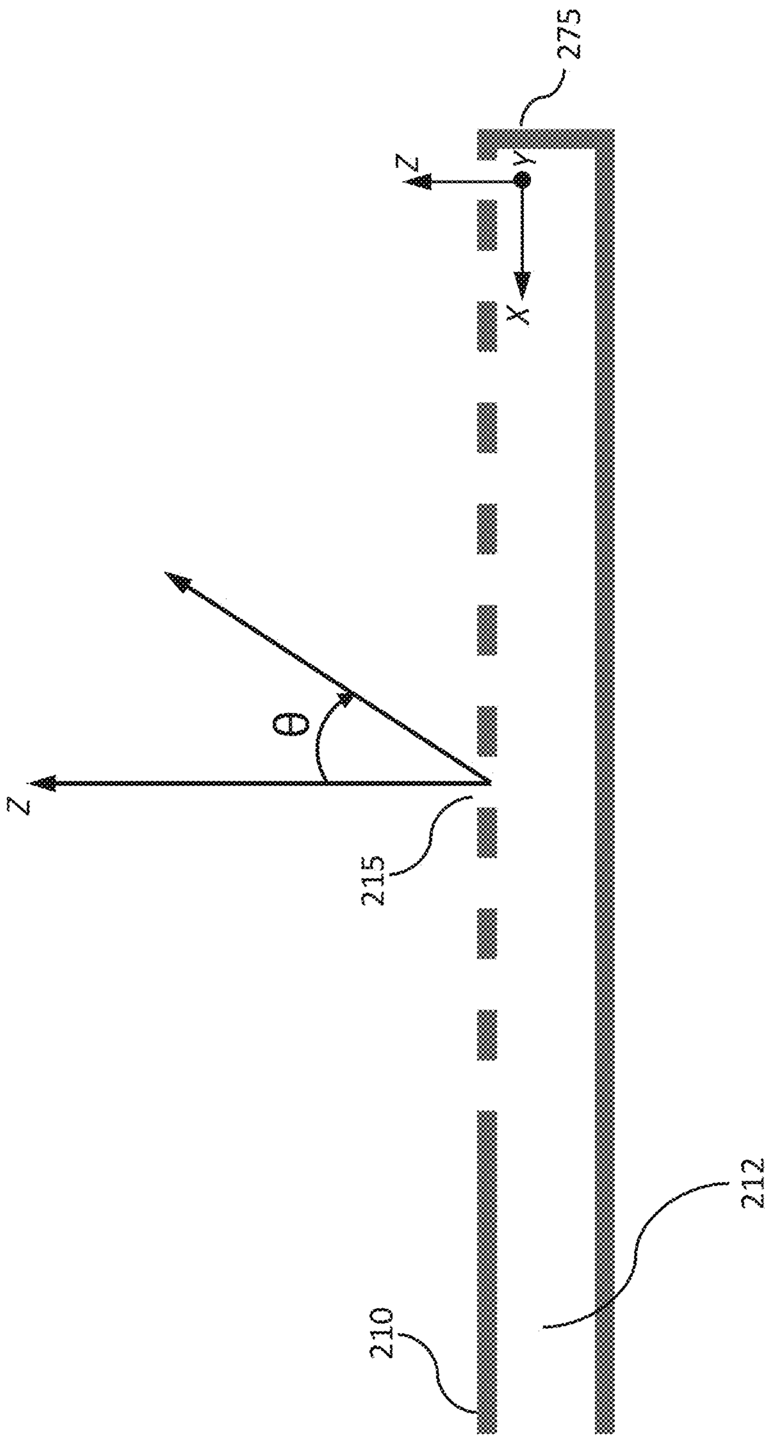
FIG. 2E shows a steering of a radiated beam by the metal-only flat metasurface of FIG. 2A.

According to an embodiment of the present disclosure, the metasurface (e.g., 215) of the metal-only flat metasurface antenna (e.g., 200 of FIG. 2A) may be a holographic metasurface. Use of such holographic metasurface may be considered as an enabling factor for use of the guided-mode in a parallel plate waveguide (i.e., above-described top/ bottom PWPs) generated by the pillbox beamformer with a planar wavefront. Following the conversion of the cylindrical wavefront (e.g., TB of FIG. 2D) to a planar one (e.g., $TB_R$ and $TB_R$ c of FIG. 2D), the guided mode within the top PWP (e.g., 212 of FIG. 2D) for a (feed) horn structure (e.g., 250 of FIG. 2D) located at the focal point of the pillbox beamformer (i.e., of the parabolic structure 245*b*) can be expressed as: $\overrightarrow{Href}=H0e^{-j\beta x}\hat{\gamma}$, where H0 is the amplitude term and $\beta$ is the guided-mode propagation constant in the top PWP. Considering the planar phase front of the guided-mode reference propagating inside the top PWP, a mathematical modeling of the holographic metasurface according to the present disclosure may be reduced to a one-dimensional problem along the x-axis. Leveraging the unit elements (e.g., 215 of FIG. 2A) as the radiating elements, a steering factor, $AF(\theta)$, of a radiated beam provided by the array of unit elements of the holographic metasurface according to the present disclosure in the theta direction (e.g., angular direction $\theta$ shown in FIG. 2E) can be defined by the following expression (a):

$$AF(\theta)=\sum_{i=1}^{N}a_{m,i}(\omega)e^{-j\beta x_i}e^{-jkx_i sin\theta} \quad \text{(a)}$$

where the index i defines the unit element number (e.g., of a row Ri shown in FIG. 7A later described with i=1, 2, . . . , k, . . . , n) along the metasurface structure, k is the free space wavenumber, xi is the element with index i, N is the number of discretized sub-wavelength pixels across the MTS aperture, and $a_{m,i}(\omega)$ is the polarizability of the unit element. To steer the beam in the theta direction, the exponent of the exponential term of the above expression (a) can be made to be equal to zero. Furthermore, the polarizability of the unit element (e.g., sheet impedance) may be selected according to the following expression (b):

$$a_{m,i}(\omega)=e^{j\beta x_i}e^{jkx_i sin\,\theta} \quad \text{(b)}$$

It should be noted that the polarizability definition according to the above expression (b) may be inherently linked to the magnetic dipole radiation mechanism of the unit elements (e.g., shapes thereof, e.g., slot-shaped) across the metasurface. The radiation from the unit elements can be modeled as magnetic dipoles along the y-axis. At a given frequency, the dipole moment of the i-th unit element, $\vec{m}_i$, is connected to the polarizability definition by means of the magnetic field at the unit element location, $\vec{H}(r_i)$, according to the following expression (c):

$$\vec{m}_i=a_{m,i}\vec{H}(r_i) \quad \text{(c)}$$

Because the length of each the unit element (e.g., 215) of the metal-only flat metasurface antenna (e.g., 200, 300, 400) according to the present disclosure never exceeds $0.4\times\lambda_g$, and therefore is smaller than the resonant limit $05\times\lambda_g$, the unit element is weakly coupled to the guided-mode.

Figure 3A:
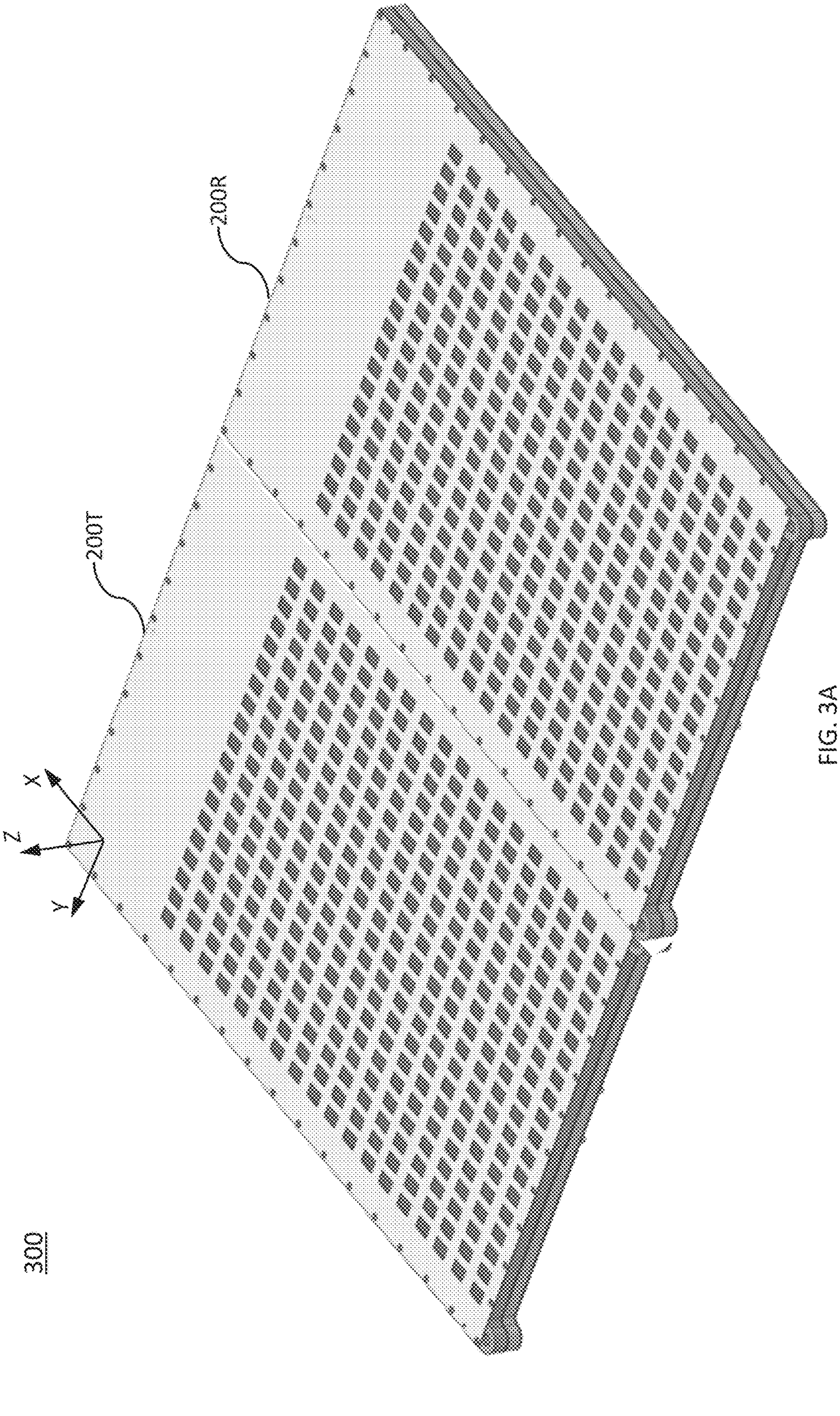
FIG. 3A shows a top side perspective view of two co-located metal-only flat metasurface antennas according to an embodiment of the present disclosure.

FIG. 3A shows a top side perspective view of two co-located metal-only flat metasurface antennas (200T, 200R) according to an embodiment of the present disclosure. Each of the metal-only flat metasurface antennas (200T, 200R) may be according to the metal-only flat metasurface antenna (200) described above with reference to FIGS. 2A-2E. As shown in FIG. 3A, the two co-located metasurface antennas (200T, 200R) may be arranged adjacent one another. According to an embodiment of the present disclosure, the metal-only flat metasurface antenna (200T) may be used as a transmit antenna and the metal-only flat metasurface antenna (200R) may be used as a receive antenna (e.g., for simultaneous transmit and receive of same or substantially same wavelengths, or different wavelengths). According to a further embodiment of the present disclosure, the two co-located metal-only flat metal surface antenna (200T, 200R) may be separated (e.g., coupled through) a metal wall arranged between the two antennas in order to decrease cross-coupling. It should be noted that during operation, all metal parts of the antenna according to the present disclosure, except a signal conductor for the feed port (e.g., port P of FIG. 6 later described), may be DC grounded. According to an exemplary nonlimiting embodiment of the present disclosure, the two co-located metal-only flat metal surface antenna (200T, 200R) may share respective plates, in other words, the respective bottom/middle/top metal plates of the two antennas may be provided by a respective single combined (single piece) metal plate.

Figure 3B:
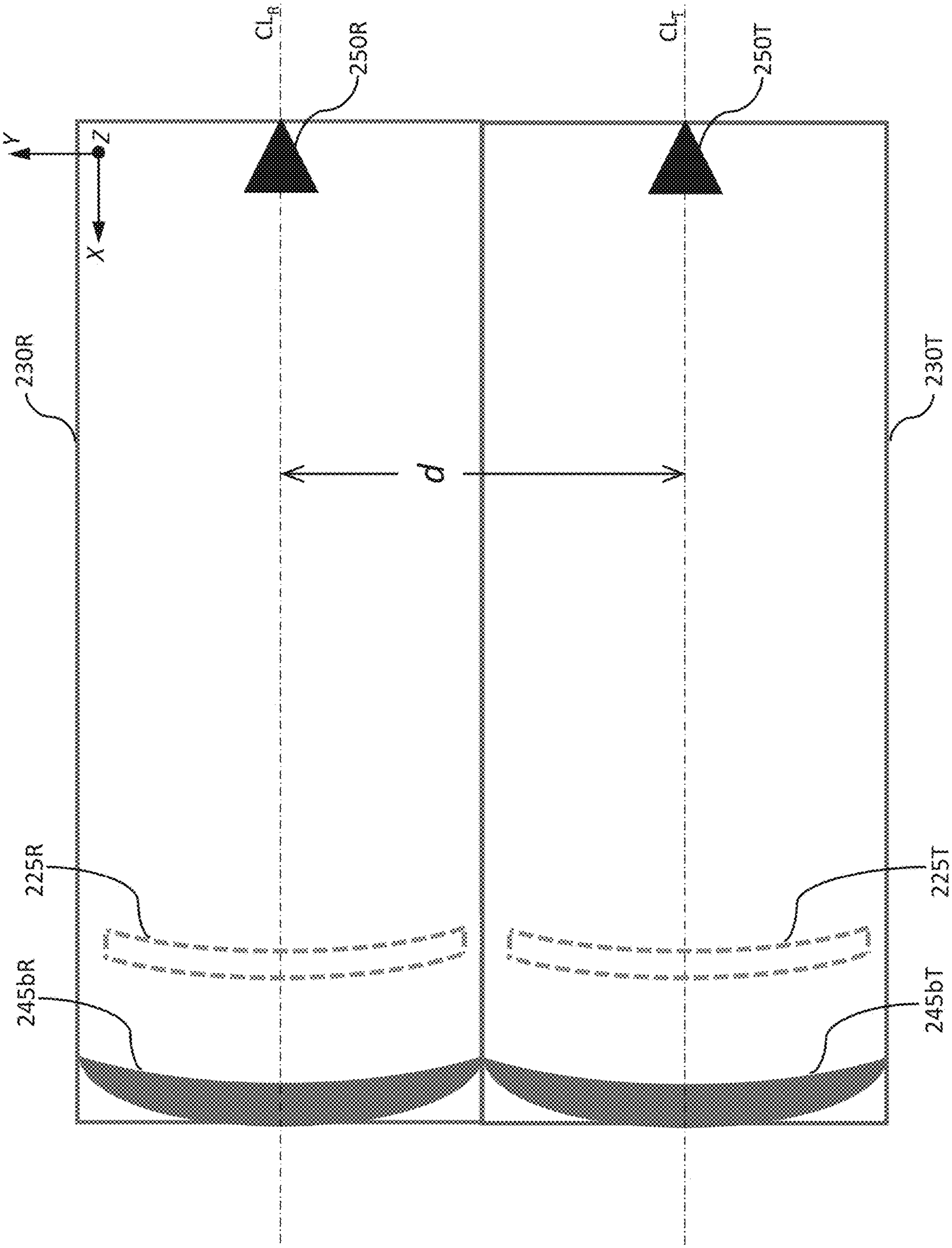
FIG. 3B shows simplified cross-sectional views of the co-located metal-only flat metasurface antennas of FIG. 3A, including a simplified cross-sectional view of respective bottom parallel plate waveguides.

FIG. 3B shows simplified cross-sectional views of the co-located metal-only flat metasurface antennas (200T, 200R) of FIG. 3A, including a simplified cross-sectional top view of the respective bottom parallel plate waveguides (e.g., including respective bottom plates 230T and 230R). Description of structures/elements shown in FIG. 3B may be readily taken from the above description with reference to (e.g., the bottom region) of FIG. 2B, where reference designators of the respective structure/elements of the antennas (200T) and (200R) shown in FIG. 3B respectively include the suffices "T" and "R". In other words, each element of the sets (225R, 230R, 245bR, 250R, $CL_R$) and (225T, 230T, 245*b*T, 250T, $CL_T$) of FIG. 3B may be likened to the elements (225, 230, 245*b*, 250, CL) described above with reference to FIG. 2B.

Figure 3C:
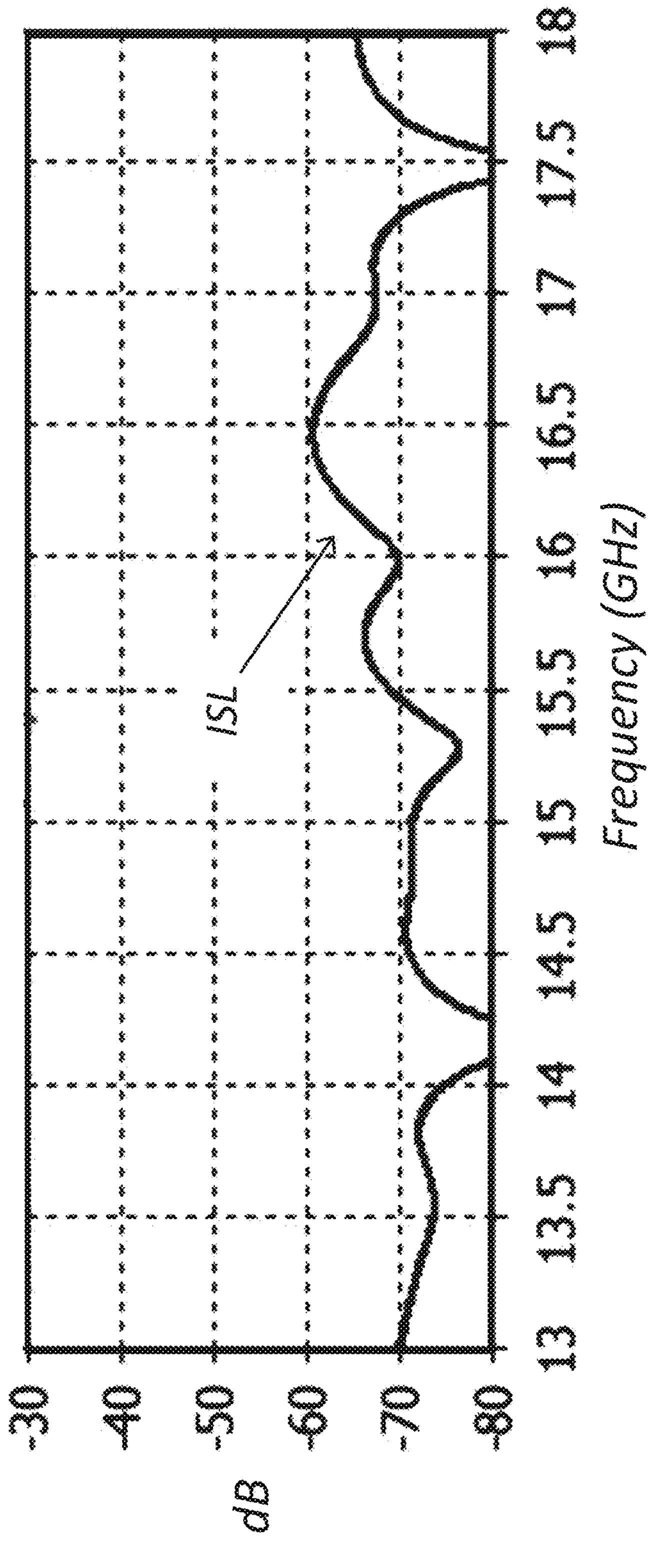
FIG. 3C shows a graph representative of isolation performance between ports of the co-located metal-only flat metasurface antennas of FIG. 3A.

As shown in FIG. 3B, the respective horn structures (250T, 250R), and therefore corresponding transmit and receive ports (e.g., ports P shown in FIG. 6 later described), are arranged at a relative distance d that may be based on a width (e.g., in a direction of the y-axis) of the metal-only flat metasurface antenna (200T) and (200R). According to an embodiment of the present disclosure, such distance, d, may be sufficient to provide a 3 dB beamwidth overlap between the two transmit and receive beams while maintaining a minimum of 65 dB isolation between the two transmit and receive ports (e.g., as shown in FIG. 3C, ISL) and a fractional bandwidth of about 6.5% (e.g., over a frequency range 15 GHz to 16 GHz). It should be noted that length (e.g., in a direction of the x-axis) and width (e.g., in a direction of the y-axis) of each of the metal-only flat metasurface antenna (200T) and (200R), and therefore the distance, d, may be based not only on an available footprint of a target system (e.g., vehicle, vessel), but also on the ratio of the focal length, F, to the aperture size, D, of the embedded parabolic structures (e.g., 245bT, 245bR of FIG. 3B). For example, for a value of a ratio F/D=1.72, the length and width of each of the antennas (200T) and (200R) may be approximately equal to 320 mm and 195 mm respectively. Applicant of the present disclosure have found that performance of the co-located metal-only flat metasurface antenna (300) according to the present disclosure, including 3 dB beamwidth overlap between the two transmit and receive beams while maintaining a minimum of 65 dB isolation between the two transmit and receive ports, and a fractional bandwidth of about 6.5%, may be provided over lower or higher frequency ranges, including, for example, over frequency ranges of the Ka-band (e.g., 26.5 GHz-40 GHz) or W-band (e.g., 75 GHz-110 GHz).

Figure 3D:
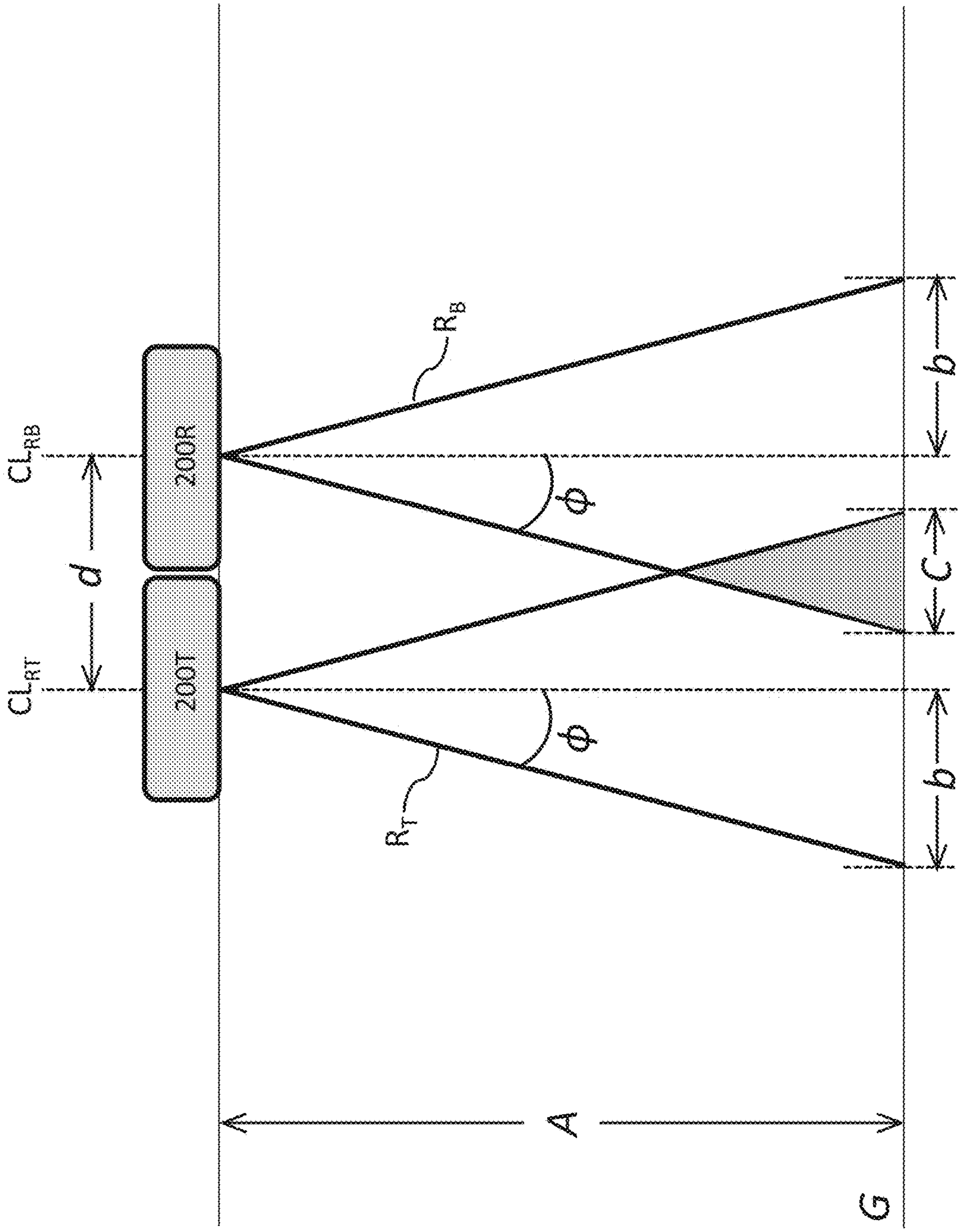
FIG. 3D shows a schematic representative of overlap between radiation beams of the co-located metal-only flat metasurface antennas of FIG. 3A.

FIG. 3D shows a schematic representative of an overlap (e.g., 3 dB beamwidth overlap, greyed region having a width C) between radiation beams ($R_T$, $R_B$, e.g., 3 dB beamwidth) of the co-located metal-only flat metasurface antennas (200T, 200R) of FIG. 3A. In FIG. 3D, the antennas (200T, 200R) are shown arranged at the above-described relative distance (e.g., offset), d, and positioned, in elevation/altitude (e.g., of a vehicle, vessel), at a distance, A, from a target surface, G (e.g., ground). As shown in FIG. 3D, the respective projections of the radiation beams onto the target surface, G, may correspond to a conical shape of the radiation beam provided by a (3 dB) radiation angle ($\phi$, equal to half the 3 dB beamwidth) centered about a respective centerline (e.g., $CL_{RT}$, $CL_{RB}$). Such radiation angle, $\phi$, may provide an overlap of the radiation beams having a width, C, at the target surface, G. The overlap width, C, may be calculated based on the known angle, $\phi$, the relative distance, d, and the altitude, A (e.g., by considering that $\tan(\phi)=b/A$). For example, for d=195 mm, A=100 m, and $\phi=3°$, then C=10.286 m. It should be noted that the pointing of each of the antennas (200T, 200R), or in other words an angle (of incidence) provided by the respective centerlines ($CL_{RT}$, $CL_{RB}$) with respect to the flat surfaces of the antennas (e.g., shown in FIG. 3D as normal), may be adjusted to result in (e.g., control) a desired overlap width, C. According to an exemplary embodiment of the present disclosure, such pointing may be provided by offsetting (e.g., along the y-axis direction of FIG. 3B) of a respective horn structure (e.g., 250R and/or 250T of FIG. 3B) with respect to the corresponding centerline (e.g., $CL_R$, $CL_T$ of FIG. 3B).

Figure 4A:
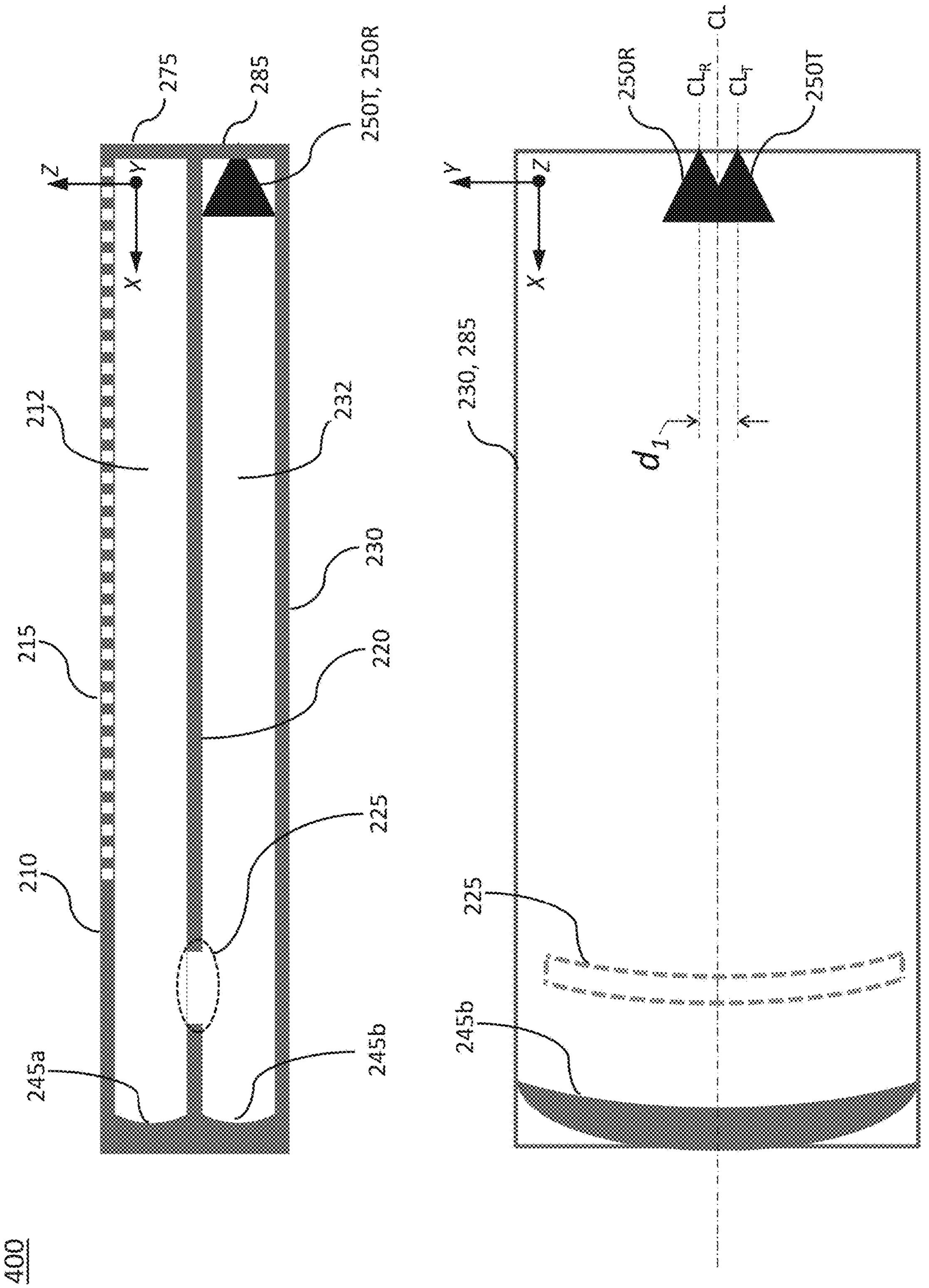
FIG. 4A shows simplified cross-sectional views of a transmit and receive shared-aperture metal-only flat metasurface antenna accordingly to an embodiment of the present disclosure.

FIG. 4A shows simplified cross-sectional views of a transmit and receive shared-aperture metal-only flat metasurface antenna (400) accordingly to an embodiment of the present disclosure. The antenna (400) may be based on the metal-only flat metasurface antenna (200) described above with reference to FIGS. 2A-2E with a difference that instead of comprising a single horn structure (e.g., 250 of FIG. 2B), the shared-aperture metal-only flat metasurface antenna (400) comprises two horn structures (250T, 250R) that may respectively be used for (simultaneous) transmitting and receiving of electromagnetic waves (e.g., of same or substantially same wavelengths, or different wavelengths). As shown in FIG. 4A, arrangement of the horn structures (250T, 250R) in the bottom parallel plate waveguide may be based on an offset (e.g., along the direction of the y-axis, offset from the focal point of the reflector structure 245*b*) of the respective horn centerlines ($CL_T$, $CL_R$) with respect to the centerline, CL (e.g., of the antenna 400 and element 245*b*). As shown in FIG. 4A, such offsets are in opposite directions along the y-axis (e.g., positive offset of 250R and negative offset for 250T, oppositely arranged about the centerline CL). All other elements/structures of the shared-aperture metal-only flat metasurface antenna (400) may be common to the metal-only flat metasurface antenna (200), a description of which can therefore be readily taken from the above description with reference to FIGS. 2A-2E.

Figure 4B:
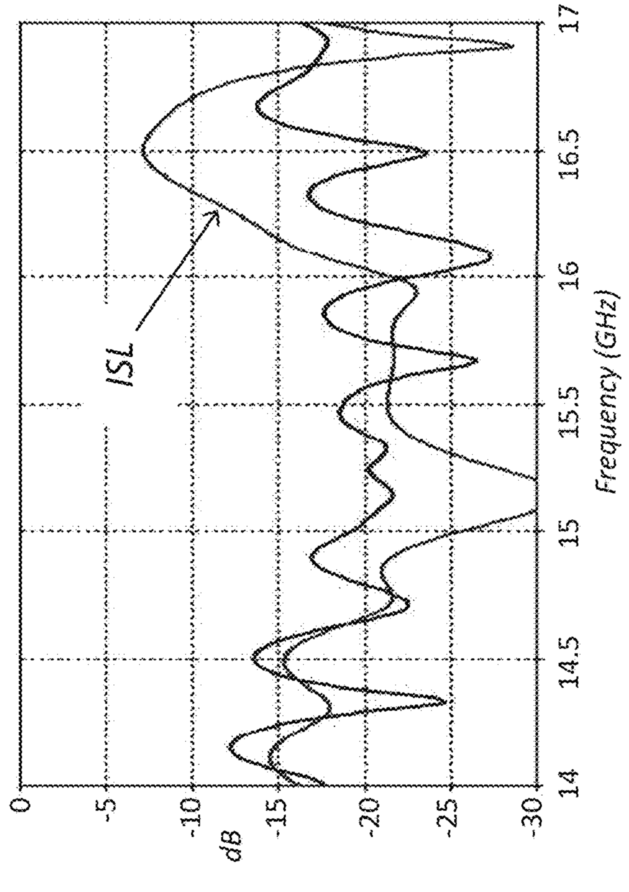
FIG. 4B and FIG. 4C shows graphs representative of isolation and 3 dB overlap performances between transmit and receive ports of the shared-aperture metal-only flat metasurface antenna of FIG. 4A.
Figure 4C:
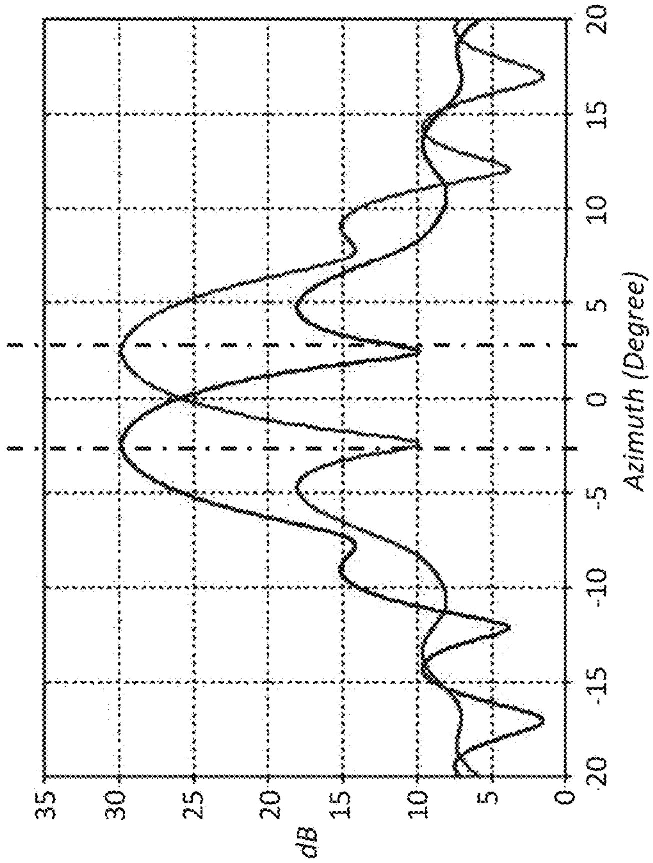

With continued reference to FIG. 4A, the offset (in the y-axis) of the respective horn centerlines ($CL_T$, $CL_R$) with respect to the centerline, CL, may define a distance, $d_1$, between the respective ports (e.g., centers, ports $P_T$ and $P_R$ of FIG. 6 later described) of the two horn structures (250T, 250R) that may be sufficient to provide a desired isolation performance between the two ports. As shown in the graphs of FIGS. 4B/4C, inventors of the present application have realized designs of the antenna (400) capable of achieving a 3 dB beamwidth overlap (of about 6 degrees between peaks of radiated power, FIG. 4C) while maintaining a minimum isolation (ISL) between the two transmit and receive ports of 20 dB and a fractional bandwidth of about 6.5% (e.g., over a frequency range 15 GHz to 16 GHz, FIG. 4B). As previously described in the present disclosure, the offset arrangement of each of the two horn structures (250T, 250R) of FIG. 4A may allow pointing (e.g., steering) of the corresponding beams in different directions (e.g., different radiation angles, $\phi$, related to the above description with reference to FIG. 3D).

According to an embodiment of the present disclosure, the isolation between the two ports (e.g., ISL of FIG. 4B), in addition to gain, side love level (SLL) and cross-polarization, may be included as performance parameters for optimization by an optimization cost function of the metasurface used in the antenna (400). Such cost function may be pre-coded to include weighting parameters to control importance/priority of each of the performance parameters. In an embodiment according to the present disclosure, such optimization may result in orthogonal transmit and receive beams through the pillbox beamformer, leading to optimized isolation between the two ports.

The metal-only metasurface flat antenna according to the present disclosure, including any of the configurations (200, 300, 400) described above, may be made by any metal that includes sufficient conductivity in a frequency range of operation of the antenna such to minimize/reduce insertion loss. According to some embodiments of the present disclosure, the antenna may be made via coating of a lower conductivity (e.g., lower cost. aluminum) metal with a higher conductivity (e.g., higher cost, platinum, gold, silver) metal to improve conductivity of the surfaces (e.g., plates used in the antenna) at the frequency range of operation while maintaining a low cost. It is important to note that the antenna according to the present teachings does not use any non-metal material, such as for example, any of the dielectric materials traditionally used in prior art metasurfaces and/or pillbox beamformers. Fabrication of an all-metal, or metal-only, antenna according to the present disclosure while providing the above-described performances, including beamwidth overlap, isolation between ports and fractional bandwidth, may be therefore considered as unexpected results.

Figure 5A:
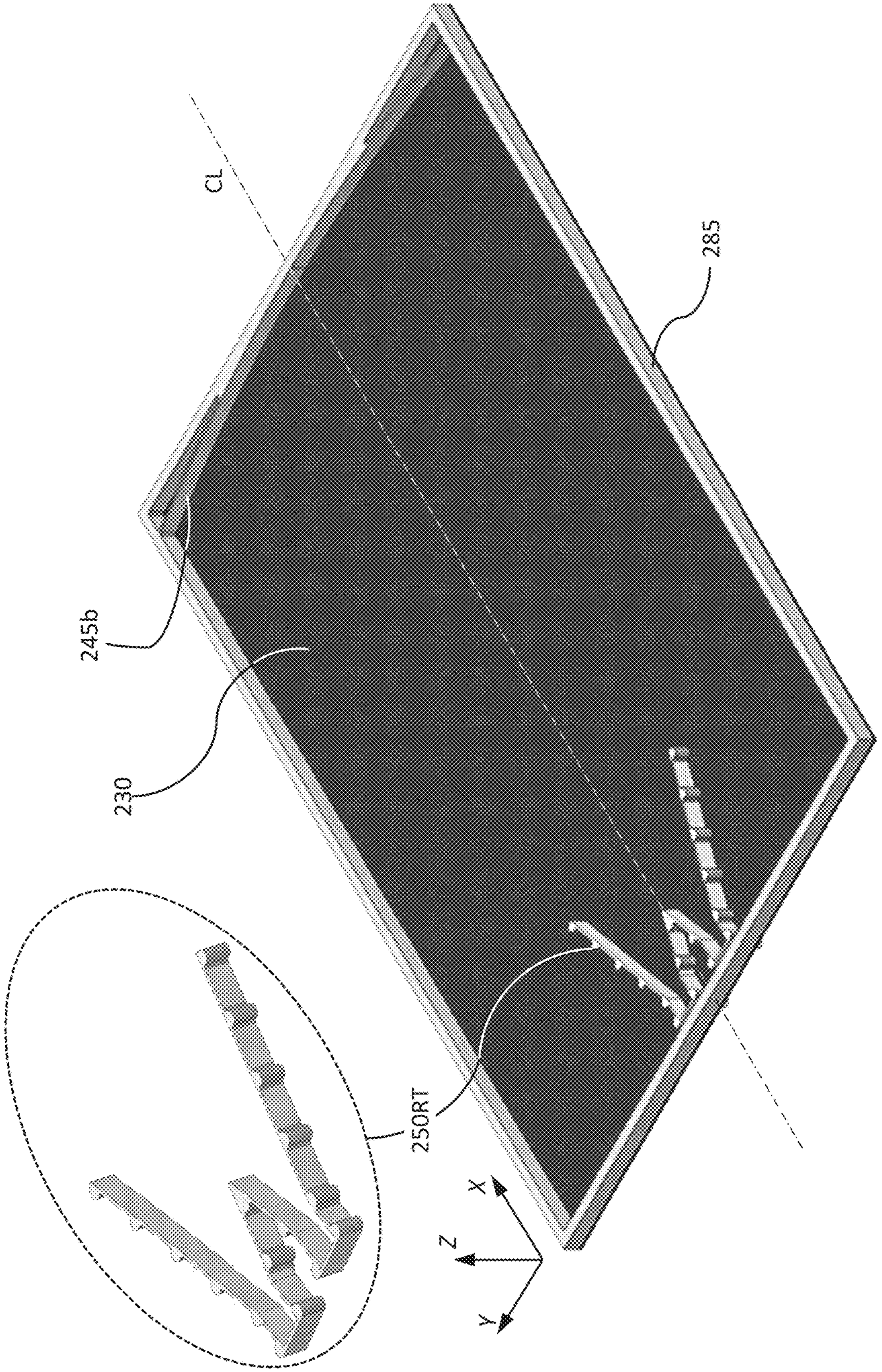
FIG. 5A shows a perspective view of a bottom assembly of the shared-aperture metal-only flat metasurface antenna of FIG. 4A, including a combined transmit and receive horn structure placed atop a bottom plate.

Because of the all-metal construction of the antenna according to the present disclosure, various fabrication/assembly methods may be used, including traditional fabrication/assembly methods (e.g., sheet metal, EDM, etc.) or newer methods, including for example, 3D printing (e.g., additive manufacturing) of the metal material(s) suitable for use in the antenna to generate a monolithic structure. Teachings according to the present disclosure may use 3D printing to form/embed/integrate structures/elements (e.g., bottom/middle/top/plates, parabolic structures, framing/wall structures, cavities, coupling slot, unit elements of the metasurface, and horn structures, etc.) of the present metal-only flat metasurface antenna. Furthermore, because of the all-metal construction of the antenna according to present disclosure, complex and expensive fabrication methods currently used in antennas using combination of metal and dielectric materials, such as for example silicon and GaAs micromachining, may be altogether avoided. In contrast to the all-metal construction of the antenna according to the present disclosure, such large micromachined antennas may be considered too brittle and as a consequence may not survive vibration, shock, and large thermal cycling. It should be noted that non-use of dielectric material in the all-metal construction of the antenna according to the present disclosure may also result in a more efficient antenna (e.g., reduced insertion loss) when compared to prior art antennas that use a combination of metal and dielectric materials. FIGS. 5A/5B later described show exemplary assemblies that may be used in the all-metal construction of the antenna according to the present disclosure.

Figure 5B:
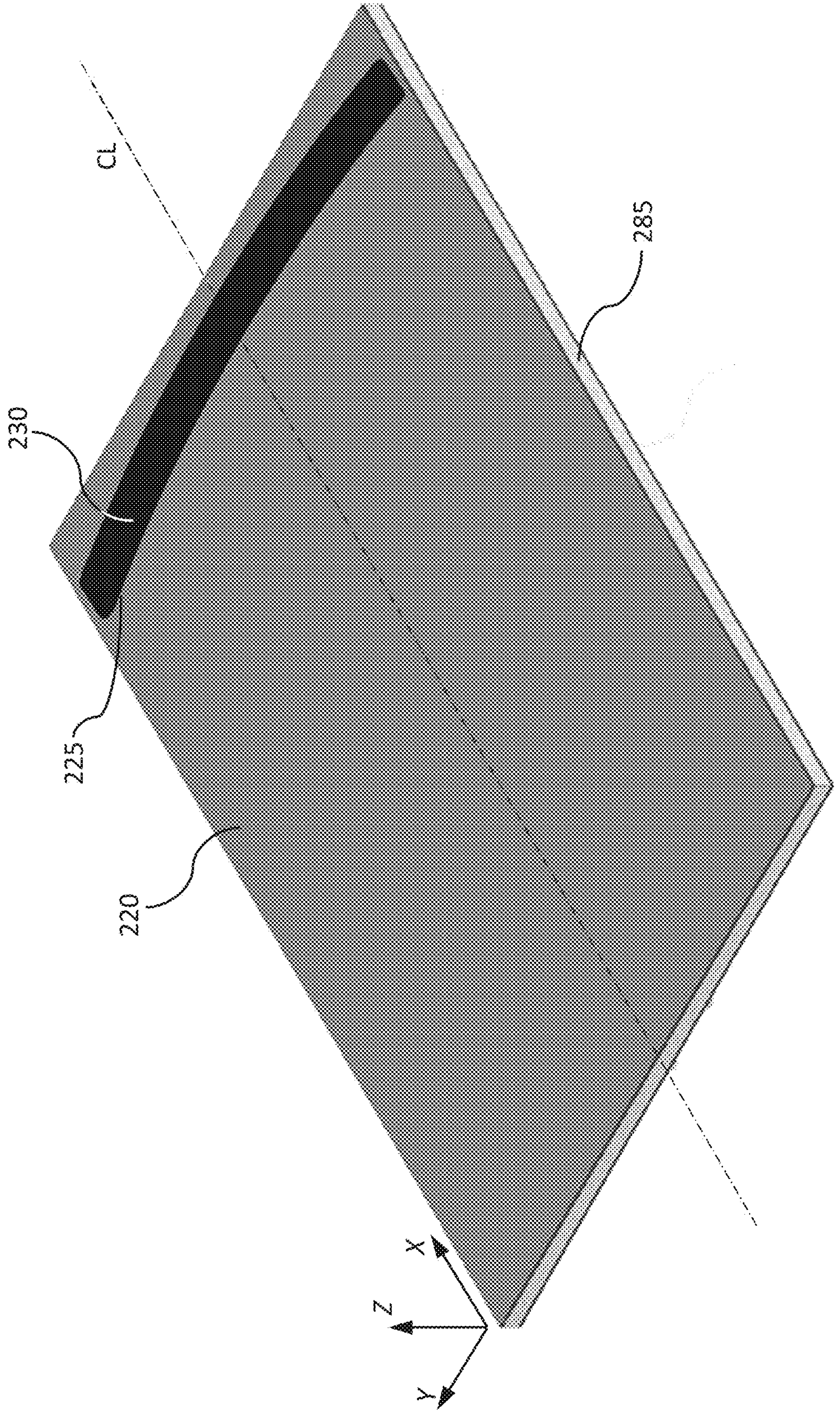
FIG. 5B shows a perspective view of a middle plate placed atop the bottom assembly of FIG. 5A.

Sub-assemblies of the metal-only flat metasurface antenna according to some exemplary nonlimiting embodiments of the present disclosure are shown in FIG. 5A and FIG. 5B. In particular, FIG. 5A shows a perspective view of a bottom assembly of the shared-aperture metal-only flat metasurface antenna (400) of FIG. 4A, including a combined transmit and receive horn structure (250RT) placed atop the bottom plate (230), and FIG. 5B shows a perspective view of the middle plate (220) including the coupling slot (225), arranged/fixed atop the bottom assembly of FIG. 5A. Furthermore, shown in FIG. 5A is the framing structure (285) that may be fixed to the bottom plate (230), the (cylindrical) parabolic structure (245*b*) that may be arranged against a distal side of the framing structure (285) and atop the bottom plate (230), and the combined transmit and receive horn structure (250RT) that may be centrally arranged against a proximal side of the framing structure (285) and fixed atop the bottom plate (230).

As shown in FIG. 5B, the middle plate may be arranged/fixed atop the framing structure (285). Completion of the assembly of the antenna (e.g., 400) may be achieved by assembling a framing structure (275) similar to the framing structure (285) and a parabolic structure (245*a*) similar to the parabolic structure (245*b*) atop the assembly shown in FIG. 5B, followed by fixing the top plate (210, e.g., FIG. 2A) that includes the metasurface structure, to the framing structure (275). It should be noted that while the description of the exemplary assemblies shown in FIGS. 5A/5B is provided with reference to the shared-aperture metal-only flat metasurface antenna (400) of FIG. 4A, substantially same description may apply to describe exemplary assemblies of the antenna (200) of FIG. 2A (uses a single centrally located horn structure) or the antenna (300) of FIG. 3A (uses two substantially same assemblies of the antenna 200 fixed/attached to one another).

Figure 6:
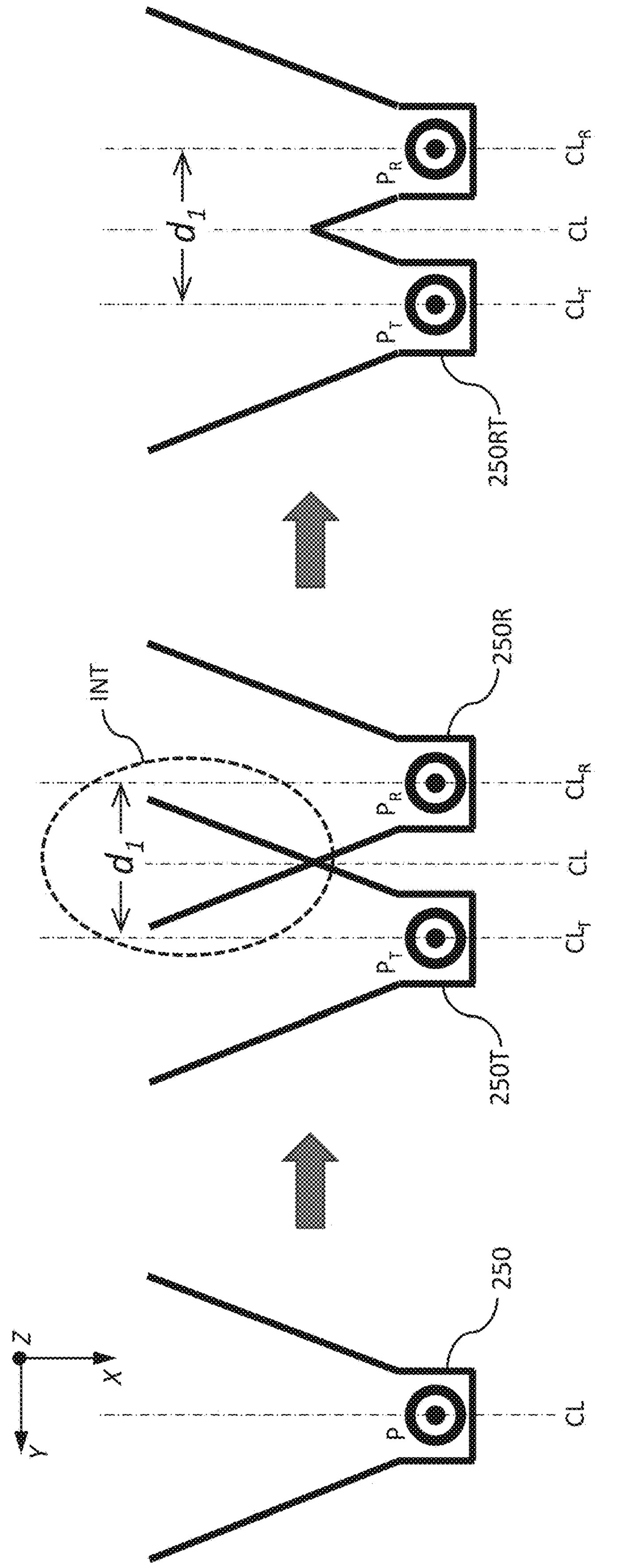
FIG. 6 shows an exemplary sequence of steps for generating the combined transmit and receive horn structure of FIG. 5A.

As shown in the detail window of FIG. 5A, according to an exemplary nonlimiting embodiment of the present disclosure, the combined transmit and receive horn structure (250RT) may comprise a single structure having a planar profile (e.g., in x, y plane) of a shape of the alphabet letter "W" that may be considered based on a combination of two adjacent and partially overlapping horn structures as shown in FIG. 6. As shown in FIG. 6, such planar profile may be described by comprising two longer diverging lateral (outer) segments and two shorter converging (and contacting) inner segments, the ports arranged between a respective one of the two lateral segments and a respective one of two inner segments. Furthermore, the structure (250RT) may include a substantially flat vertical extension (e.g., along the z-axis) that corresponds to the height of the (bottom) cavity (e.g., as defined by the framing structure 285).

FIG. 6 shows an exemplary sequence of steps for generating the combined transmit and receive horn structure (250RT) of FIG. 5A. Shown on the left side of FIG. 6 is a (single feed) horn structure (250) comprising a flat conical profile (e.g., in the x, y plane) having a corresponding axis of symmetry coinciding with the centerline CL. A (feed) port, P, that may include for example, a coaxial connector (e.g., for a feedthrough connection/mating from a bottom/external side of the bottom plate 230 of FIG. 5A), may be centrally arranged at the base (e.g., throat) of the horn structure (250). When used in the antenna (200) of FIG. 2A or (300) of FIG. 3A, the port P may be arranged at the focal point of the respective parabolic structure (e.g., 245*b*, 245bR, 245bT).

Shown in the middle of FIG. 6 is two horn structures (250T) and (250R) arranged at close proximity according to a distance, $d_1$, that is configured to provide a desired 3 dB beamwidth performance (e.g., radiated power graphs of FIG. 4C) of the two beams associated to the two horn structures (e.g., 250R, 250T of FIG. 4A). Another constraint of the distance, $d_1$, may be the 3 dB beamwidth overlap performance (e.g., degrees between peaks of radiated power shown in graphs of FIG. 4C), such constraint further limiting the relative position of the two horns to a distance, $d_1$, that as shown in FIG. 6 may cause physical interference, INT, between the two horn structures (250T) and (250R) about the centerline, CL. As the shape of the horn structures (e.g., conical angle) may be preset and defined by a prescribed ratio F/D (optically) linking the horn structures to the parabolic structure (e.g., 245*b* of FIG. 4A), it follows that according to an embodiment of the present disclosure, as shown in the left side of FIG. 6, the combined transmit and receive horn structure (250RT) of FIG. 5A may be derived by truncating the two (similar) horn structures shown in the middle of FIG. 6 to remove the physical interference, INT, while (substantially) maintaining the preset (alphabet letter V) shape of the two horns, thereby obtaining the single structure (250RT) having the planar profile (e.g., in x, y plane) of the shape of the letter "W".

Figure 7A:
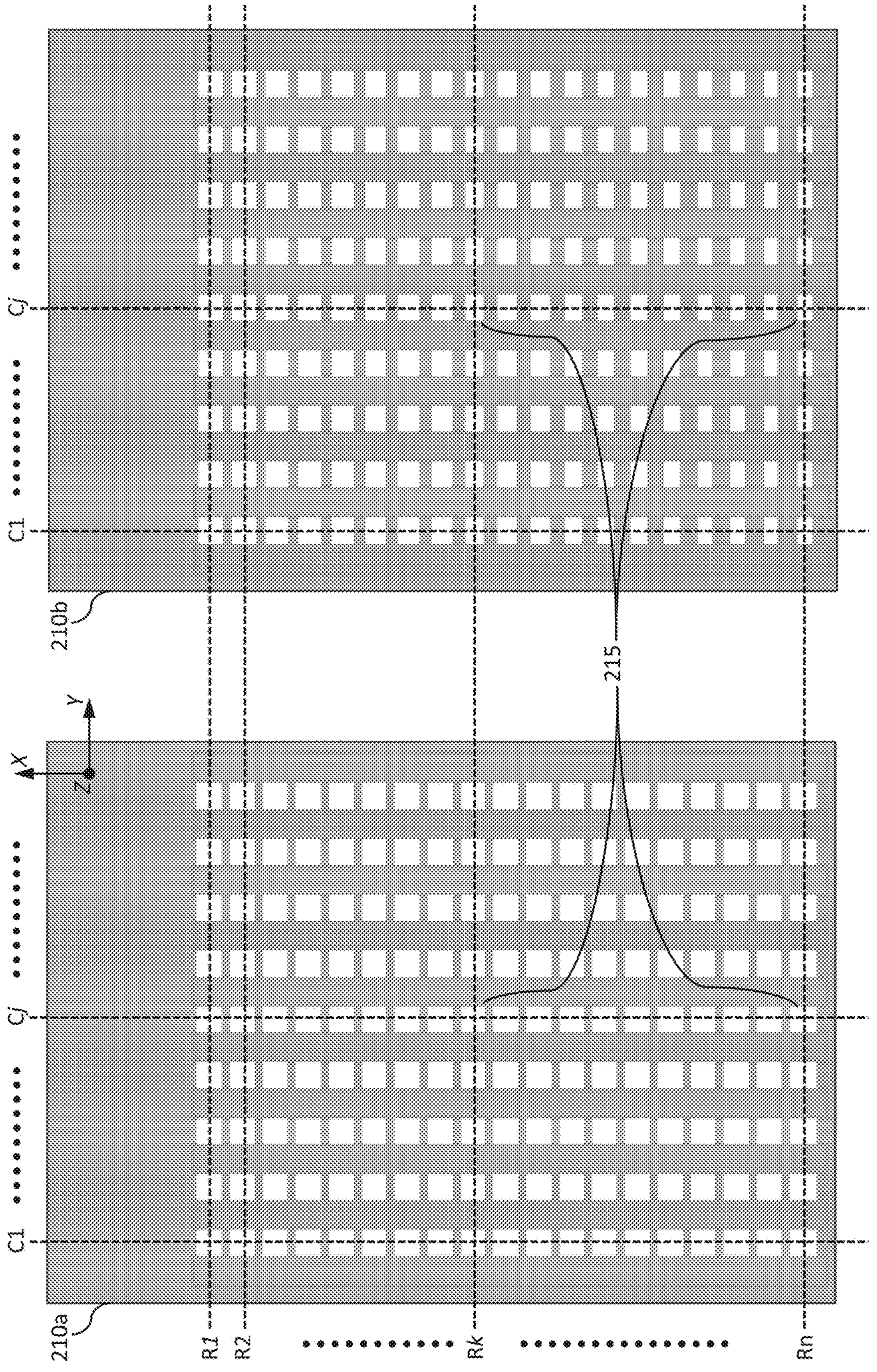
FIG. 7A shows two exemplary metasurfaces with unit cells having openings of a uniform or tapered size.

FIG. 7A shows two exemplary metasurfaces formed in respective top (metal) plates (210*a*, 210*b*), each metasurface comprising an array of unit elements (250) having openings of a uniform (e.g., 210*a*) or tapered (e.g., 210*b*) size. According to an exemplary nonlimiting embodiment, the array of unit cells (250) of the respective top plates (210*a*) and (210*b*) may be arranged according to a plurality of rows (e.g., R1, R2, . . . , Rk, . . . , Rn arranged allow the x-axis), and a plurality of columns (e.g., C1, . . . , Cj, . . . , arranged along the y-axis). As shown in FIG. 7A, the respective arrays of unit cells may cover a portion of the respective planar surfaces of the top plates (e.g., 210*a*, 210*b*). As previously described, such portion may be configured so that an extension of the unit elements (215) along a direction of the x-axis may not overlap the coupling slot (e.g., 225 of FIG. 2B). In other words, a position along a direction of the x-axis of the last row of unit elements (215) shown in FIG. 7A (e.g., R1, farthest away from the first row Rn that is arranged in a region of the horn structure) may not reach a position of the coupling slot.

Figure 7B:
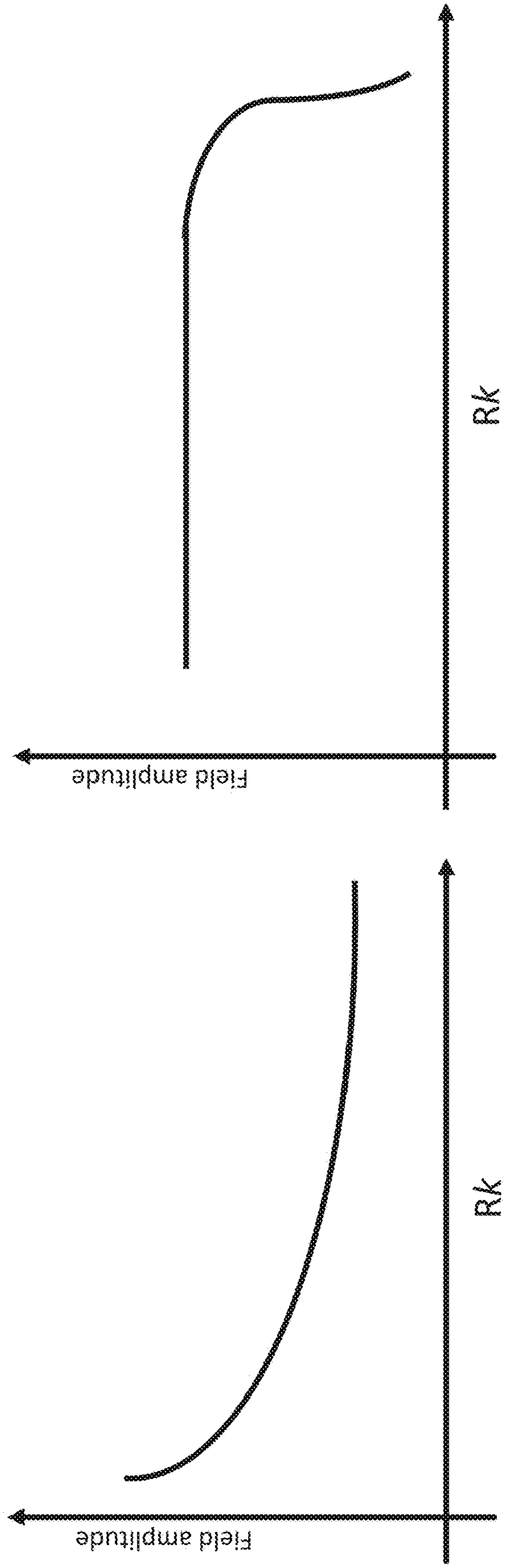
FIG. 7B shows graphs representing field amplitudes of the two exemplary metasurfaces of FIG. 7A Like reference numbers and designations in the various drawings indicate like elements.

As shown in the left side of FIG. 7A, the unit elements (215) of the top plate (210*a*) may include rectangular (e.g., square) openings having a uniform size. In particular, a width along the y-axis and a length along the x-axis of each rectangular opening may be constant/fixed for each column (e.g., Cj) and for each row (e.g., Rk) of the array of unit elements (215). As shown in the left side of FIG. 7B, such uniform size of the openings of the unit elements (215) may result in a non-uniform power (e.g., field amplitude) radiated across the rows (e.g., Rk, k=1, 2, . . . , n), which in turn may result in lower (aperture) efficiency (e.g., of about 40%), and therefore lower gain, of the antenna (e.g., 200, 300, 400) using a metasurface with such unit elements.

It follows that, as shown in the right side of FIG. 7A, a length of each rectangular opening associated to a unit element (215) may be tapered to decrease in a direction of decreasing index (e.g., k) of the rows (e.g., Rk). In other words, unit elements (215) of a same row (e.g., Rk) may have a same size (length and width), and unit elements (215)

of a row (e.g., R1) that is closer to the horn structure may have a size (e.g., length) that is smaller compared to the size of the unit elements (215) of a row (e.g., Rn) that is farther from the horn structure (and therefore closer to the parabolic structure). Such tapered configuration of the sizes of the unit elements (215) may therefore result, as shown in the right side graph of FIG. 7B, in a (substantially) uniform power (e.g., field amplitude) radiated across the rows (e.g., Rk, k=1, 2, . . . , n) and therefore of the metasurface, thereby substantially increasing (aperture) efficiency (e.g., from 40% to about 60%) and gain of the antenna.

Teachings according to the present disclosure may apply tapering of the sizes of unit cells (215) for radiation of a substantially uniform power across the rows of the metasurface by various analytical and/or optimization means. According to an exemplary embodiment of the present disclosure, a simple mathematical function can be selected to describe the size of each unit cell (e.g., unit element 215) as a function of its position (e.g., along a direction of the x-axis, increasing values of the row index, k). Such simple mathematical function may be based on few parameters (variables) to describe the size of a unit cell, thereby reducing a required computational effort by reducing the number of parameters. For instance, the length ($l_k$, e.g., according to the x-axis) of a given unit cell (e.g., unit element 215) in a row (e.g., k=1, 2, . . . , n) can be described by the following expression (d):

$$l_k = X_0 . e^{\frac{-((k-1)-b)^2}{2c^2}} \quad \text{(d)}$$

thereby reducing optimization of the sizes of the unit cells (215) to three parameters, $X_0$, b, c (e.g., used to change/control a curve that defines sizes/lengths in space of the unit elements).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The references in the present application, shown in the reference list below, are incorporated herein by reference in their entirety.

The invention claimed is:

1. A metal-only flat metasurface antenna comprising:

a pillbox beamformer comprising a top metal plate, a middle metal plate, and a bottom metal plate of a same planar profile for provision of a top parallel plate waveguide stacked on a bottom parallel plate waveguide, the middle metal plate shared between the top and bottom parallel waveguides; and a metasurface structure formed in the top parallel plate waveguide and provided by an array of non-resonant subwavelength unit elements formed in the top metal plate, wherein the pillbox beamformer and the metasurface structure are made exclusively from a metal material, and wherein the top and bottom parallel plate waveguides form respective top and bottom air cavities for propagation of a guided-mode electromagnetic wave.

2. The metal-only flat metasurface antenna of claim 1, wherein:

each unit element of the array of non-resonant subwavelength unit elements comprises an opening through the top parallel plate waveguide having a size that is strictly smaller than half the wavelength of the guided-mode electromagnetic wave.

3. The metal-only flat metasurface antenna of claim 2, wherein:

for each unit element, the size of the opening is smaller than, or equal to, 0.4 times the wavelength of the guided-mode electromagnetic wave.

4. The metal-only flat metasurface antenna of claim 3, wherein:

for each unit element, the opening has a shape of a rectangular slot having length and width that is smaller than, or equal to, 0.4 times the wavelength of the guided-mode electromagnetic wave.

5. The metal-only flat metasurface antenna of claim 2, wherein:

the top metal plate and the middle metal plate provide parallel plates of the top parallel plate waveguide that are separated by air of the respective top air cavity, and the bottom metal plate and the middle metal plate provide parallel plates of the bottom parallel plate waveguide that are separated by air of the respective bottom air cavity.

6. The metal-only flat metasurface antenna of claim 5, wherein:

the array of non-resonant unit elements is formed in the top metal plate according to a plurality of rows and a plurality of columns, and unit elements of each row of the plurality of rows are of a same size.

7. The metal-only flat metasurface antenna of claim 6, wherein:

unit elements of each column of the plurality of columns are of the same size.

8. The metal-only flat metasurface antenna of claim 6, wherein:

unit elements of each column of the plurality of columns are of different sizes.

9. The metal-only flat metasurface antenna of claim 8, wherein:

the different sizes are according to a tapering function.

10. The metal-only flat metasurface antenna of claim 9, wherein:

the tapering function is an exponential function.

11. The metal-only flat metasurface antenna of claim 5, wherein:

the top and bottom parallel plate waveguides comprise respective top and bottom parabolic structures arranged at respective first ends, and the bottom parallel plate waveguide comprises a horn structure arranged at a respective second end opposite the respective first, wherein the respective top and bottom parabolic structures and the horn structure are made exclusively from a metal material.

12. The metal-only flat metasurface antenna of claim 11, wherein:

the horn structure comprises a single feed port that is arranged at a focal point of the bottom parabolic structure.

13. A co-located metal-only flat metasurface antenna, comprising:

a first antenna according to the metal-only flat metasurface antenna of claim 12; and a second antenna according to the metal-only flat metasurface antenna of claim 12, the second antenna arranged adjacent the first antenna so to maintain a flat profile, wherein the first antenna is a transmit antenna configured to transmit a transmit beam from an aperture provided by the metasurface structure of the first antenna, the transmit beam sourced at the single feed port of the first antenna, and wherein the second antenna is a receive antenna configured to receive a receive beam from an aperture provided by the metasurface structure of the second antenna, the receive beam received at the single feed port of the second antenna.

14. The co-located metal-only flat metasurface antenna of claim 13, wherein:

the first antenna and the second antenna are fabricated as monolithic structures via additive manufacturing.

15. The metal-only flat metasurface antenna of claim 11, wherein:

the horn structure comprises two feed ports oppositely arranged about an axis of symmetry of the bottom parabolic structure at respective offsets of a focal point of the bottom parabolic structure.

16. The metal-only flat metasurface antenna of claim 15, wherein:

a distance between the two feed ports provided by the respective offsets is configured to provide respective desired 3 dB beamwidth performance of respective beams associated to the two feed ports, and the respective offsets are configured to provide a desired 3 dB beamwidth overlap performance of the respective beams.

17. The metal-only flat metasurface antenna of claim 15, wherein:

the horn structure comprises a planar shape according to the alphabet letter "W" comprising two longer, and distant, diverging lateral segments and two shorter, and in contact, converging inner segments that make contact on the axis of symmetry of the bottom parabolic structure, and the planar shape provided by arrangement in close proximity of two V-shaped horn structures having respective axes of symmetry passing through the two feed ports and about which respective diverging and converging lateral segments extend, the converging lateral segments shortened by truncation to avoid physical interference between the two V-shaped horn structures.

18. A shared-aperture metal-only flat metasurface antenna, comprising:

an antenna according to the metal-only flat metasurface antenna of claim 15, wherein the shared-aperture metal-only flat metasurface antenna is configured to:

transmit a transmit beam from an aperture provided by the metasurface structure, the transmit beam sourced at a transmit port of the two feed ports of the horn structure, and receive a receive beam from the aperture provided by the metasurface structure, the receive beam received at a receive port of the two feed ports of the horn structure.

19. The shared-aperture metal-only flat metasurface antenna of claim 18, wherein:

the antenna is fabricated as a monolithic structure via additive manufacturing.

20. The metal-only flat metasurface antenna of claim 1, wherein:

the metasurface structure is a holographic metasurface structure.

21. The metal-only flat metasurface antenna of claim 1, wherein:

the metal material comprises aluminum, silver, gold or platinum.

22. The metal-only flat metasurface antenna of claim 1, further comprising:

a metal framing structure for support and separation of the top, middle and bottom metal plates of the top and bottom parallel plate waveguides.

23. A shared-aperture metal-only flat metasurface antenna comprising:

a pillbox beamformer comprising a top metal plate, a middle metal plate, and a bottom metal plate of a same planar profile for provision of stacked top and bottom parallel plate waveguides with embedded parabolic structures, the middle metal plate shared between the top and bottom parallel waveguides and said parallel plate waveguides electromagnetically coupled to one another via a coupling slot formed in the pillbox beamformer; and a holographic metasurface structure formed in the top parallel plate waveguide and provided by an array of non-resonant subwavelength unit elements formed in the top metal plate, said metasurface structure configured to provide an aperture for simultaneous transmission of a transmit beam and reception of a receive beam, wherein each unit element comprises a rectangular slot having length and width that is smaller than, or equal to, 0.4 times a wavelength of the transmit or receive beam;

wherein the top and bottom parallel plate waveguides form respective top and bottom air cavities for propagation of the simultaneous transmission of the transmit beam and reception of the receive beam, the pillbox beamformer further comprises a horn structure in the bottom parallel waveguide, the horn structure comprising a transmit port for sourcing the transmit beam and a receive port receiving the receive beam, and the pillbox beamformer and the holographic metasurface structure are made exclusively from a metal material.

24. The shared-aperture metal-only flat metasurface antenna of claim 23, wherein:

the pillbox beamformer is configured to transform a cylindrical wavefront of the transmit beam that propagates in the bottom parallel waveguide to a planar wavefront that propagates in the top parallel waveguide; and the pillbox beamformer is further configured to transform a planar wavefront of the receive beam that propagates in the top parallel waveguide to a cylindrical wavefront that propagates in the bottom parallel waveguide.

* * * * *